US008244597B2

(12) United States Patent
Klinger et al.

(10) Patent No.: US 8,244,597 B2
(45) Date of Patent: Aug. 14, 2012

(54) METHOD AND SYSTEM FOR MONETIZING CONTENT

(75) Inventors: Theresa Klinger, Alamo, CA (US); Ariel Wada, Larkspur, CA (US)

(73) Assignee: Pure Verticals, Inc., San Leandro, CA (US)

( * ) Notice: Subject to any disclaimer, the term of this patent is extended or adjusted under 35 U.S.C. 154(b) by 291 days.

(21) Appl. No.: 12/381,603

(22) Filed: Mar. 13, 2009

(65) Prior Publication Data
US 2009/0182646 A1    Jul. 16, 2009

Related U.S. Application Data

(63) Continuation-in-part of application No. 12/291,207, filed on Nov. 7, 2008, and a continuation-in-part of application No. 11/968,374, filed on Jan. 2, 2008.

(51) Int. Cl.
*G06Q 30/00* (2012.01)
(52) U.S. Cl. .................. 705/26.7; 705/26.1
(58) Field of Classification Search .............. 705/26, 705/27, 26.1, 26.7, 27.1
See application file for complete search history.

(56) References Cited

U.S. PATENT DOCUMENTS

| | | | |
|---|---|---|---|
| 2007/0271147 A1* | 11/2007 | Crespo et al. .............. | 705/26 |
| 2008/0140502 A1* | 6/2008 | Birnholz et al. ............ | 705/10 |
| 2008/0154951 A1* | 6/2008 | Martinez et al. ........... | 707/103 Y |
| 2008/0255934 A1* | 10/2008 | Leventhal et al. .......... | 705/14 |
| 2008/0255962 A1* | 10/2008 | Chang et al. ............... | 705/27 |

OTHER PUBLICATIONS

Anonymous, "Capazoo Launches New Social Life Networking and Entertainment Website That Transcends the Virtual; Unique Model Allows Members to Gain Recognition and Financial Rewards for Content and Participation," PR Newswire, Oct. 22, 2007.*

* cited by examiner

*Primary Examiner* — Jeffrey A Smith
*Assistant Examiner* — Brandy A Zukanovich
(74) *Attorney, Agent, or Firm* — Galvin Patent Law LLC; Brian R. Galvin

(57) ABSTRACT

An e-commerce system, comprising an endorsement engine and interface software coupled to the endorsement engine and adapted to interact with one or more content sources connected over a network and adapted to enable subscriptions from users using a protocol, is disclosed. In an embodiment, the interface software enables an endorsing user to browse the content sources and select a content item, to enter code associated with the selected content element, to view product information, to select a product for endorsement, and to enter code associated with the selected product. Upon retrieval of content by a viewing user who previously subscribed to the content source using the protocol, at least one of the content-specific code and the product-specific code is also provided to the viewing user via the protocol. Upon activation of the content-specific code, the viewing user is connected to the selected content and is able to view the selected content, and upon activation of the product-specific code by a viewing user, the viewing user is connected to a network-connected shopping cart, and is thereby enabled to buy the product.

1 Claim, 16 Drawing Sheets

METHOD AND SYSTEM FOR MONETIZING CONTENT

CROSS-REFERENCE TO RELATED APPLICATIONS

The present invention is a continuation-in-part of U.S. patent application Ser. No. 12/291,207, titled "Method and System for Monetizing Third-Party Content", filed on Nov. 7, 2008, and is a continuation-in-part of U.S. patent application Ser. No. 11/968,374, titled "Method and System for Monetizing User-Generated Content", filed on Jan. 2, 2008, disclosure of both of which is hereby incorporated by reference in its entirety.

BACKGROUND OF THE INVENTION

1. Field of the Invention

The present invention is in the field of e-commerce, particularly as it pertains to virtual communities such as social networks, online gaming communities and "virtual worlds" and to content aggregators that make third-party content available to members of virtual communities. Yet more particularly, the present invention pertains to monetization of third-party content through virtual communities using networks such as the Internet.

2. Discussion of the State of the Art

In the field of entertainment media, several trends have emerged in recent years, quite separately, that when combined offer surprising new possibilities for individuals and enterprises alike. One of these trends is emergence of product placements as a new kind of advertisement. This now familiar technique involves advertisers (vendors of products such as personal computers, cars, liquors and toys, just to name a few) paying content creators (movie studios, TV studios and others) to display or refer to their products in prominent ways within the content itself. This is in stark contrast to previous practices in advertising, where the boundary between advertising and entertainment content was clearly defined; with product placements, commercial messages can be included within content for which consumers pay to view, and with which consumers are strongly emotionally engaged.

A second trend is democratization of content creation. In the age of the great movie studios, control of content creation (at least in the new media of radio and the movies) was entirely within the hands of a few very powerful businessmen. Later, as the costs of high quality production came down, and as more and more channels to market became available, first through UHF television stations and later through cable and satellite systems, content creation became more diffuse, taking place across thousands of companies acting in various capacities. But only recently has serious content routinely been created by individuals acting as consumers rather than as employees of media companies. The emergence of "user-generated content" (UGC) has been a large part of the post-2000 boom in user-centric web services, which commonly is labeled broadly as Web 2.0. Today, with blogs, personal web pages, and sites for the uploading of user-generated music and video clips, more and more of what people read, hear and watch is created outside of the corporate world and in the world of UGC.

Another important trend has been emergence of highly targeted advertising. Advertising once was a mass media affair, and segmentation tended to go no further than choosing during which radio or television shows to advertise. Today, Internet portal companies, search engines, marketing database companies with access to credit card and other financial data all compete to precisely target advertisements to ever more finely sliced segments of the consumer population. The rapid rise of Google has also shown how much the advertising equation has changed; while charging only a tiny fraction of what traditional media charged for advertising, and while permitting only the most rudimentary text-based advertising, Google has grabbed a significant share of the advertising market and has built a highly profitable business, because its ad placements are highly targeted and because advertisers only pay when ads are clicked.

Finally, the last few years have seen emergence of another new category of web-based entity, the virtual community. A well-known emerging category of virtual community is social networks. Already there are thousands of these, ranging from the very large operators such as MySpace or Facebook to very small, highly verticalized players. There are even companies selling platforms for launching new social networks quickly and inexpensively. And social networking has quickly become one of the major outlets for user-generated content (in fact, one can view each subscribers profile page as a form of UGC). As is typical in web trends, the original social networking pioneers offered "something for nothing", and most social networking sites continue to offer a wide range of free services. But soon after, people began seeking ways to develop profitable business models to monetize the large numbers of loyal users that had been created in a very short time. Much as Google did in search, these pioneers are looking to advertising to satisfy the need to generate revenue from highly visited social networking sites, and they are typically adopting the methods used by Google—allowing users to provide advertisers access to their profile pages in return for a small slice of the advertising revenue. This is by now a well-understood business model—the site operator, the user whose profile page is used, the media buyer and others each take a piece of the total advertising spend committed by the advertisers (these by and large are the same kinds of companies as in all of the previous ages plus the new web-based companies).

Beyond social networks, other forms of virtual communities have become commonplace in the art. Among these are online gaming communities in which large numbers of individuals cooperate and compete in network-hosted gaming systems. Many of these are typified by games that are indefinite in nature, and it is common for complex social structures similar to social networks to arise intentionally or merely as a result of actions taken by many people in pursuit of their goals. Many online gaming communities include a strong element of user-generated content, with similar challenges and opportunities for monetization of this content. Other forms of virtual communities typified by widespread adoption and propagation of user-generated content, and the concomitant need for means to monetize that content, include "virtual worlds" and file sharing communities. All of these are merely exemplary of a strong shift away from static content to user-generated content in the online world, and these examples should not be considered to be limiting for the purposes of the present invention. All virtual communities in which user-generated content plays a prominent role provide background for, and will benefit from, the present invention.

Additionally, a vigorous new e-commerce market category has emerged recently commonly referred to as content aggregators. These sites, which resemble virtual communities and may be considered a subset of that category, allow users (whether individual consumers, boutique content creation companies, or major media outlets) to upload content that can then be searched and viewed freely by users of the content aggregator sites. Importantly, these sites generally also provide rich functionality for tagging, rating and commenting about content by any and all users. These sites are actively experimenting in methods for monetizing their sites, generally by placing ads on their page that are targeted based on the content viewing selections of individual users or groups of users. Additionally, these sites have enabled the embedding of advertising within the content on their sites, such as at predefined insertion points (or times) in streaming videos. In the art at the time of the present invention, the methods known to the inventors all involve the selection of advertisements for insertion by the content aggregator or a partnered advertising network.

One limitation of the currently emerging model of allowing advertisers to place ads on users' profile pages and other user-controlled or user-generated content hosted in virtual communities is that it is a largely passive affair from the users' point of view. A user can, for instance, subscribe to one of the many affiliate advertising services and make a space available for ads to be displayed, but the user has no control over what ads are displayed. Advertisers will display ads that seem to correlate well with the content of the page (for instance, a user's blog on "the new physics" will likely show ads from a science magazine, whereas one that focuses on a particular sports team would likely show ads promoting sports apparel or memorabilia). But the user cannot choose, and certainly the user cannot block undesirable advertisers from her page.

This limitation, besides providing for the possibility of incongruous and occasionally counterproductive ad placements, also leads to an inability of mainstream advertisers to take advantage of the most powerful aspect of virtual communities—which is precisely that virtual communities are self-organized market segments. People who network together whether in a broad "network of friends" sense or in a narrow "network of first edition enthusiasts" sense, automatically define segments of great interest to advertisers, as these virtual communities generally will share much in common, including buying habits. But since the essence of virtual communities is their self-organization and, accordingly, their dynamic nature, the traditional advertising model falls short.

This problem is exacerbated by the challenges faced by content aggregators. As with virtual communities, advertisement placement is largely a passive targeting function performed either by a content aggregator or by an advertising network that partners with a content aggregator. Ads can be targeted based on the tagging and commentary associated with given media content, and can be inserted in the content or on the page around the content while it is being viewed. But there is no provision in the art today for the users to select advertisements and thereby to endorse products that they prefer. Additionally, content aggregators generally only have access to advertising revenues while users are actually on their sites; if the content is allowed to be embedded and displayed on third-party sites (such as a user's profile page in a virtual community), the content creator and content aggregator have no way to make money except by inserting ads into the media itself without any knowledge of where the content is being viewed, or by whom.

What is clearly needed in the art is a way to bring together the worlds of advertising, virtual communities, and content aggregation in a way that serves the best interests of all of the key constituents—those who wish to advertise, those who wish to monetize their content, those who aggregate content from others, those who manage virtual communities, and those to whom advertisements are directed. Users of virtual communities, should they be able to influence what is advertised to them, and when and how it is advertised to them, would be able to achieve the reasonable goal of having ads that address their particular needs and preferences, at a particular point in time or generally, and to share in the benefits thus created. And, in a continuation of the trend away from mass advertising that the search-based ad illustrates, advertisers would be able to precisely target content at those virtual networks that are most predisposed to favorably react to the message, and to do so at a remarkably low cost thus driving revenue per ad dollar up dramatically. Content creators would be able to enjoy much greater and more targeted revenue-generating distribution channels, and content aggregators would be able to greatly expand their opportunities for monetizing user-generated content (UGC) that is hosted on their sites.

It is an aim of the present invention to provide a system and a method for monetizing the user-generated content that dominates virtual community sites, and to provide advertisers a method to "ride the user-generated content" wave in order to achieve improved levels of targeting specificity and return on investment. It is a further aim of the present invention to provide a system and method for monetizing third-party content by enabling endorsing users to select third-party content for display on pages or sites they control, to select products or services they wish to endorse, and to associate their endorsements with the third-party content.

Internet content is often accessed by users employing various reader applications such as Google Reader which collects related content from many sources into one convenient place using the Really Simple Syndication (RSS) standard. This has become a very efficient and convenient way to peruse multiple publications. There is thus a need for the published content that is accessed by RSS technology to have endorsed product placements pass through to the viewer along with the featured content. An embodiment of this invention enables the viewer to click on specific endorsed products through an RSS accessed content page and be routed directly to a universal shopping cart for check out. This ability vastly expands the potential market for an authors endorsed product. Endorsers can offer their content pages on RSS feeds and still retain the potential revenue shares for sales of products endorsed in their publications that are ultimately viewed from an RSS reader.

The value of targeting a specific product or marketing campaign to a specific group of potential buyers is well documented. Advertisers, merchants, and virtual community organizers all have much to gain by understanding what works and what doesn't work with a specific target audience. Yet in the past it has not been possible to collect, in one place, all the data concerning the products promoted, the context in which such promotions are viewed, the personal characteristics of the endorsers of the products, and the personal characteristics of the viewer of the promotion. Furthermore it has not generally been possible to monitor all behavioral events from ad placement, to ad display and viewing, to "click through" on ads, and finally to actual transactions, especially when (as is common) these events take place in different online locations. For instance, ad placement decisions are made in one place generally using a specialized tool. Ads are viewed in association with content that could be hosted anywhere, and when a user clicks through an ad she is generally taken to yet another location. Actual purchases are often conducted on yet another online location. There exists a very real need for a comprehensive data collection facility to aggregate data on products, content, endorsers, and viewers/purchasers, with the data encompassing all activities from ad selection to ad placement, ad viewing, ad click through, product viewing and selection, and shopping cart/checkout transactions. Furthermore, it is desirable to make all of this data available in business intelligence user interfaces to allow users who are merchants/advertisers, virtual community managers, content owners or creators, and endorsers to analyze the effectiveness of their previous decisions and to optimize their online merchandising activities.

SUMMARY OF THE INVENTION

In an effort to solve the problems described above of monetizing user-generated content and third-party content, the inventors conceived of a fundamental shift in the longstanding paradigm of advertising. Specifically, they conceived of the notion of shifting from the model of vendors hawking their own wares through various advertising means involving the pushing of vendor materials to potential consumers to the model of users promoting and selling products that they personally find valuable or useful. Accordingly, the inventors provide a system for the monetization of user-generated or third party content using user-controlled product placements within, adjacent to, or near the content.

In an embodiment of the invention, an e-commerce system comprising an endorsement engine executing on a network-connected server and an interface software executing on a network-connected server coupled to the endorsement engine and adapted to interact with one or more content sources connected over a network and adapted to enable subscriptions from users using the protocol. In the embodiment, the interface software enables an endorsing user to browse the content sources and to select a content item. The interface software further enables the endorsing user to enter code associated with the selected content element. The interface software further enables the endorsing user to view product information concerning products available for endorsement and to select a product for endorsement, and to enter code associated with the selected product, the product-specific code compatible with the selected content item. Also in the embodiment, upon retrieval of content by a viewing user who previously subscribed to the content source using the protocol, at least one of the content-specific code and the product-specific code is also provided to the viewing user via the protocol, and upon the activation of the content-specific code by a viewing user, the viewing user is connected to the selected content still located at its original content source and is able to view the selected content while still connected to the interface software, and upon the activation of the product-specific code by a viewing user, the viewing user is connected to a network-connected shopping cart, and is thereby enabled to buy the product.

In another embodiment of the invention, a method for monetizing online content is disclosed. In the embodiment, information and code related to a specific product is transmitted across a network from a network-connected server to an endorsing user, and information and code related to a specific content element suitable for online display is retrieved from a third party and made available to the endorsing user. In the embodiment, the product-related code and content-related code is embedded into a software module executing on a network-attached server on request from the endorsing user, and subscription to the specific content element or its source via a protocol by a viewing user is enabled. Additionally, in the embodiment, upon the content-related code being activated by a viewing user following retrieval of the content element according to the subscription, the viewing user is enabled to view the retrieved content element and, upon the product-related code being activated by the viewing user while viewing the retrieved content, the viewing user is connected to a network-connected shopping cart, thereby enabling the viewing user to purchase the product.

BRIEF DESCRIPTION OF THE DRAWING FIGURES

DETAILED DESCRIPTION

The inventors provide, in one embodiment, a system and a method for monetization of "user-generated content" (UGC) in which creators of UGC are enabled to select from a variety of products, from a variety of vendors, and to make them available for viewing and purchase entirely within their UGC. That is, it is an object of the present invention that creators of UGC are able to choose product information about products of their choosing and to embed that information, in a variety of ways, into their content. It is an object of this invention that viewers of UGC that has been prepared using the instant invention will be able to view the images or information associated with the products being promoted by the creator of the particular UGC, and to purchase such promoted products, or to mark them for potential future purchase, as desired. It is yet another object of this invention to provide a monetary reward to the creators of UGC who thus successfully promote products for sale; it should be understood, however, that rewards other than money may also be given to such creators of UGC according to the invention. For example, "loyalty points" such as frequent flyer miles could be rewarded as a proxy for monetary reward, without departing from the spirit of the invention. Where "monetization" and "money" are used in this specification, they should be understood to mean "monetization or the like" and "money or an equivalent reward"; the form of the reward provided is not an essential element of the invention and the invention accordingly should not be limited to cases involving actual monetary transfers.

Figure 1:
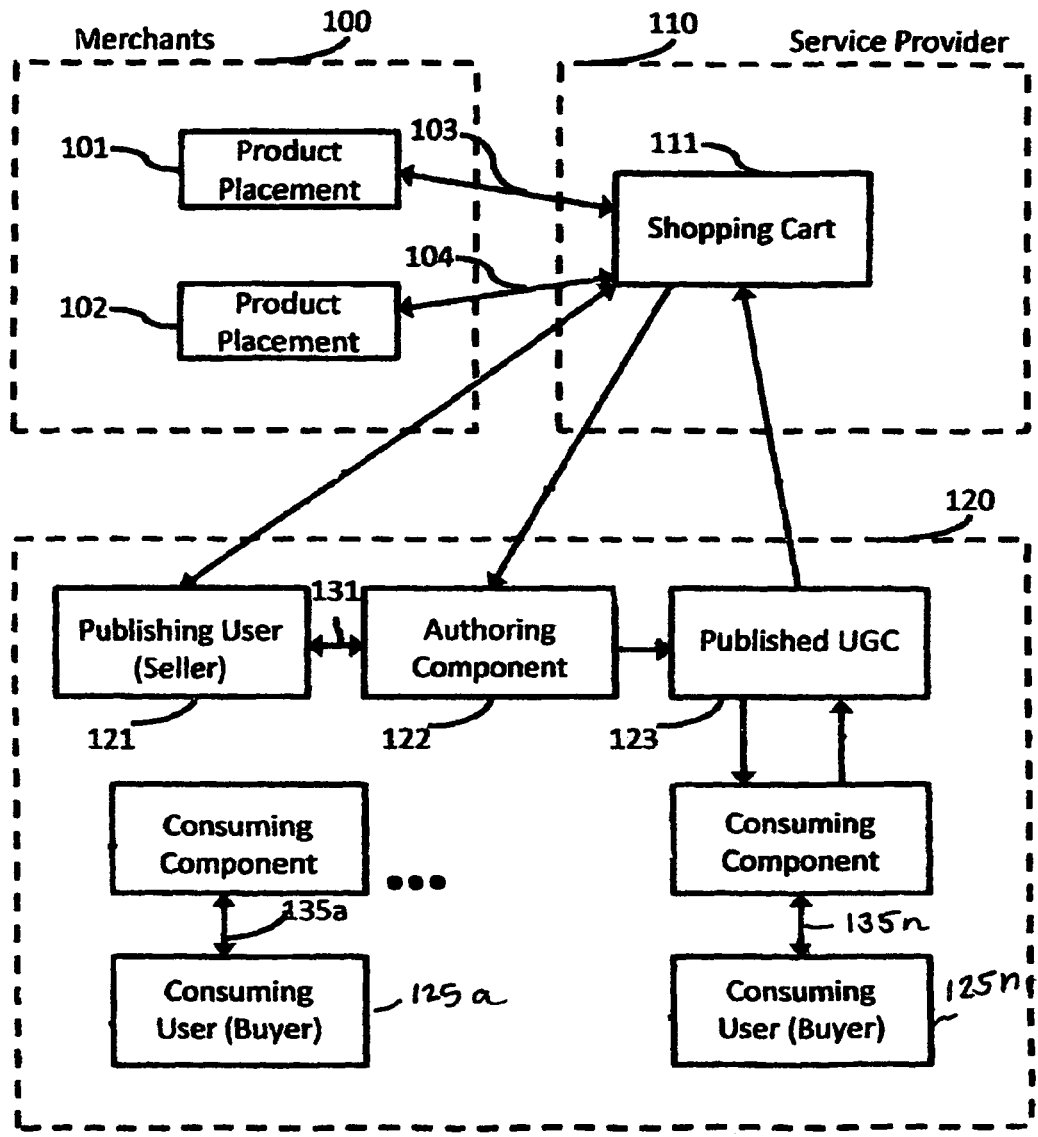
FIG. 1 is a block diagram of components of the invention in one embodiment, highlighting different roles played in carrying out the invention.

FIG. 1 is an illustration of an embodiment of the invention in which a virtual community 120 is enhanced by the provision of a universal shopping cart 111, which can be provided as a service by a service provider 110 such as a third party web services provider. The universal shopping cart 111 alternatively can be provided by the virtual community 120 itself, without the need of a third party service provider 110. The universal shopping cart 111 of the invention provides a means for merchants 100 to make product placements 101, passing product information about products that are available for sale through the virtual community 120 using interface 103 to the universal shopping cart 111, as well as a means for receiving sales transactions 102 from the universal shopping cart 111 via another interface 104. It should be noted that the interfaces 103 and 104 need not be separate, but the functions of product placement 101 and sales transactions 102 could be carried out over a single interface between the merchant's 100 systems and the universal shopping cart 111.

Virtual communities 120 are common on the Internet today, and typically provide their members (121 and 125a through 125n) with a variety of services intended to enable them to establish their own social groupings dynamically in a content-rich way. Among these services, virtual communities 120 typically provide some form of authoring component 122, where a publishing user 121 can create and edit content 131 and, when satisfied, make that content available as published UGC 123 to other users (125a through 125n) via consuming components (135a through 135n). Without loss of generality, it should be noted that in a preferred embodiment the authoring component 122 is a web page where publishing users may create and edit content 131 such as blogs, profile pages, photos, videos, personal web pages and the like. Also without loss of generality, it should be noted that in preferred embodiment the consuming components (135a through 135n) are web browsers, and the published user-generated content 123 consists of pages within a social network's 120 web site that contain the UGC 123 created by user 121 in authoring component 122.

While in an embodiment the virtual community 120 is one of the many familiar social networks available on the Internet, it should be understood that the invention can be used to market goods and services to any human network 120, for example (but not limited to) console or online gaming systems where gamers create UGC 123 and the gaming industry operates the universal shopping cart 111 of the invention, kiosks where UGC is delivered to malls or stores using the method of the invention (the universal shopping cart 111 in this case could be operated by an operator of a chain of malls, or a chain of stores, or by a specialist third party who places kiosks in prominent places to allow consumption of UGC 123 by network members), virtual worlds where groups or entire virtual societies are formed and the universal shopping cart 111 is operated either by the host of the virtual world or by a third party service provider, or even offline networks such as groups of "friends and family" who subscribe to a value-added mobile phone service that allows users to create and post content that can be viewed on mobile phone service that allows users to create and post content that can be viewed on mobile phones, and where the mobile phone carrier or one of its partners operates the universal shopping cart 111. An important element of the invention is provision of a universal shopping cart 111 whereby members of a human network can incorporate product information from merchants 100 into their published user-generated content 123 in order to promote the sale of those products, and the fact that the consumers (125a through 125n) of the published UGC 123 can view product promotions and product information as an integral part of the user-generated content, and that they can purchase products or mark them for later review and possible purchase, entirely within the published UGC 123 via the consuming component (135a through 135n). Only when finished and ready to check out does the consuming user (now a Buyer) (125a through 125n) interact with the universal shopping cart 111, specifically by going through the shopping cart's check-out procedure.

Figure 2:
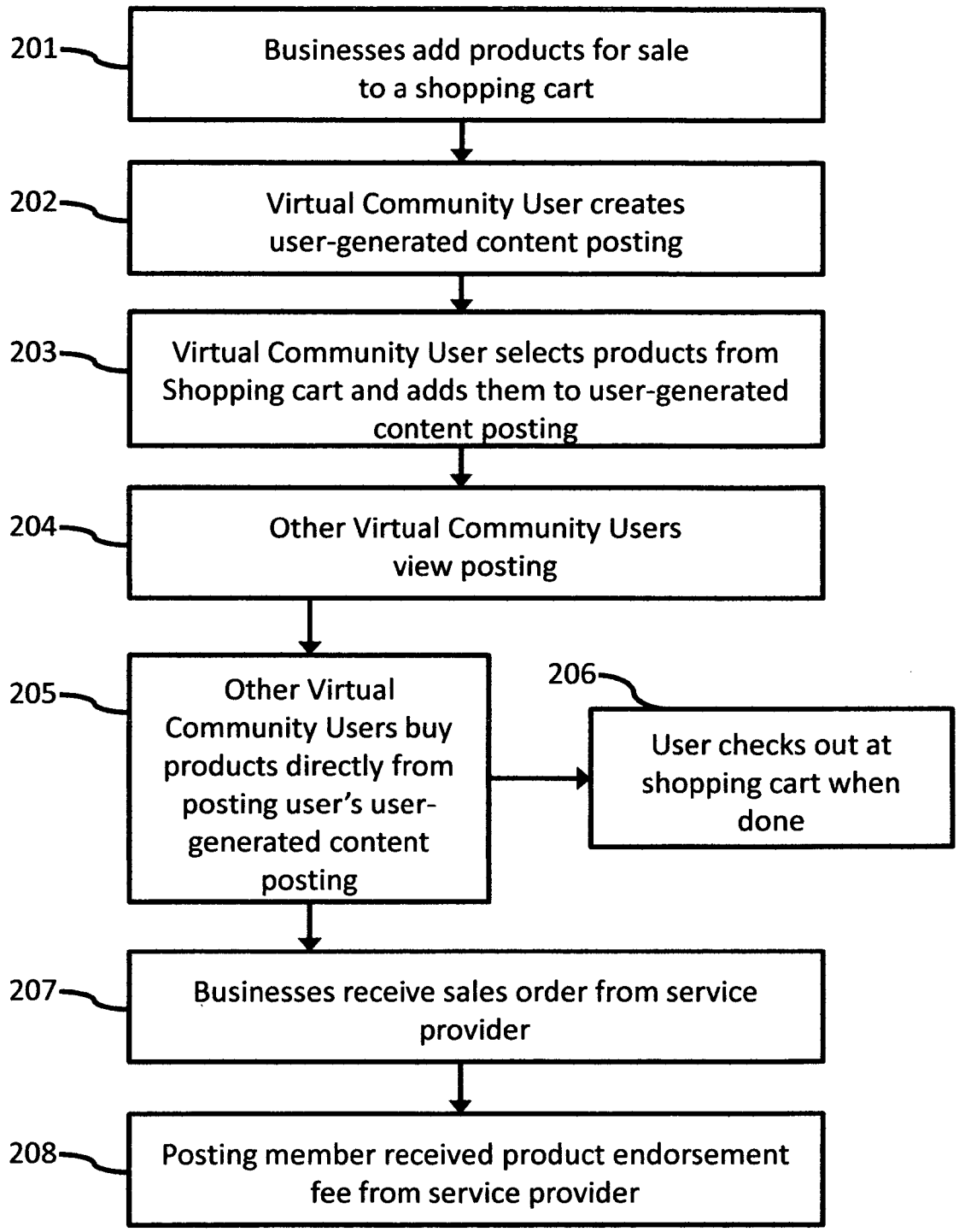
FIG. 2 is a process flow diagram of a method of the present invention.

FIG. 2 outlines a method of the present invention. Preliminarily (201), businesses add products available for promotion and sale via the virtual community 120 to the universal shopping cart 111. Merchants can specify terms under which the products can be promoted and sold when adding them to the shopping cart. Clearly one of the key terms is price, which can be expressed as a fixed price or as a range of prices. In an embodiment of the invention, products can be placed in the universal shopping cart 111 for auction within the virtual community, and members of the virtual community could add that product to their UGC 123 and thereby accept bids; the winning bid would get the product, and the creator of the UGC 123 from which the winning bid was entered would receive a reward from the service provider 110 that operates the universal shopping cart 123. Businesses may also upload additional information about their products into the universal shopping cart, for example the dates when the product is available, product images, shipping costs and schedules, promotional materials in text, image or video form, and so forth. In an embodiment of the invention, merchants may specify demographic or other information about the target market of the product, although it should be clear that among the key benefits of the instant invention is the fact that it is the users who self-select by choosing what products to promote and with what people to associate; merchants implicitly are marketing to the people who associate with (network with) the people who choose their products to promote within their UGC 123. By making demographic and other information about who might find the product most useful, merchants are not so much targeting a market segment as they are advising those who self-select the market segment.

In step 202, virtual community members create user-generated content for posting or publishing as published UGC 123. As mentioned above, this step could comprise many possible actions by members of the virtual community, including but not limited to posting a blog entry, creating a video, adding content to a personal web page, updating a personal profile page, or adding a comment or essay in a public forum section of the virtual community. The virtual community member then selects products from the universal shopping cart and adds them to her user-generated content posting 203. The user actually inserts or embeds a block of code downloaded from the universal shopping cart 111 into her user-generated content 123; this embedded code block could for example be hypertext markup language (HTML), extensible markup language (XML) or the like. The code could contain a link to an image or a video, such that when a viewer of the UGC 123 clicks on the link they can view the image or watch the video. Such techniques are well established in the art. The embedded code can also contain means for executing a purchase or for marking an item for later review and purchase. These means could be, but are not limited to, a "Buy" button viewable by the user ("user" herein refers to the consumer (125a through 125n) of user-generated content), a "hot spot" in an image or a video which, when moused over, displays a "buy this item" tag, or other similar means.

After the creating user has created her content and added products from the universal shopping cart 111, other virtual community members view the newly published posting 204 and may optionally choose to view or buy products that are promoted in the new posting. In particular, in step 205 some virtual community members buy products directly from the posting member's user-generated content posting. The user may choose to continue viewing UGC 123 of the same user, or indeed may move on to other network members' user-generated content 123. This is an important advantage of the present invention: users may continue browsing the same or other users' UGC 123 as desired, and thereby they may accumulate several purchase decisions (or tentative decisions) before deciding to check out and complete purchases. Users can move to checkout at any time or they may be prompted, if they elect to leave the social network, to go to checkout. Optionally, a virtual community member's product selections may be kept on hold and revisited on a subsequent visit to the virtual community; this functionality is implicit in the universal shopping cart, which receives (through the mechanism of the embedded code) a notification each time a user selects a product for viewing or purchase and can store this information for use when the user returns. When a user ultimately does decide to purchase, they proceed to the universal shopping cart checkout 206 where they can choose to add or drop products, add or change method of payment, select shipping options, and so forth. Note, however, that in embodiments where the virtual community is not an online network, but is a network of humans conducting offline interactions, the checkout feature will still be present. As is discussed below, there will be a communications means of some sort, typically internet protocol (IP) based, between the user-generated content and the universal shopping cart, and this communications means would be used as well for checkout.

Once a purchase has been made, the merchant (or merchants; a single checkout can be conducted to purchase products from a plurality of merchants, and indeed from a plurality of UGC promotions) receives notification of the order and payment arrangements from the service provider 110 that operates the universal shopping cart (step 207; recall that this service provider could in fact be the operator of the virtual community as well, but need not be). Finally, the member from whose UGC 123 each purchase decision was made receives an endorsement fee or other monetary reward from the service provider 110 in step 208. Again, from a single "browsing expedition" or web session, multiple purchases from multiple UGC promotions could be made. And the products could be from multiple merchants. Accordingly, each transaction is tracked in the universal shopping cart as a tuple, record, or set of data elements containing at least the buyer's identity, the content creator's identity, and the product's identity (which can be tied to the merchant based on the data provided in step 201).

Figure 3:
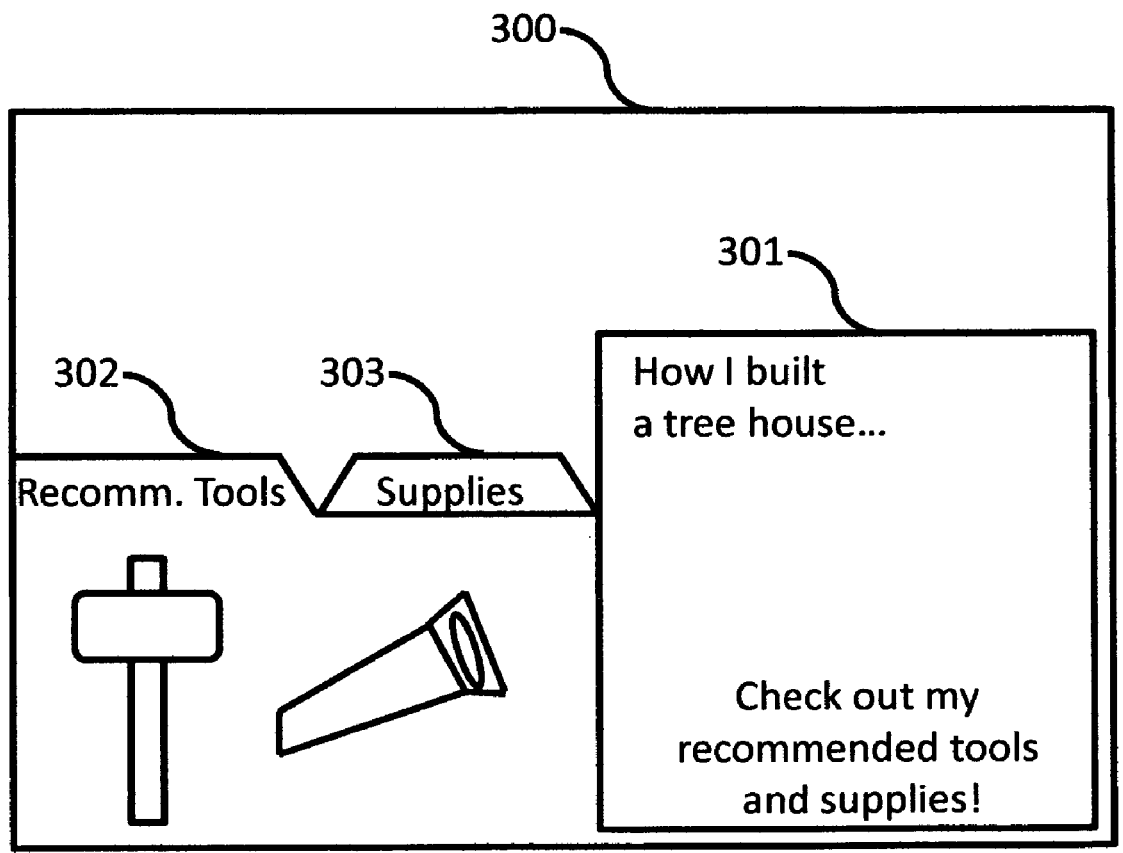
FIG. 3 is an example of a user-generated content page illustrating how users can consume monetized user-generated content according to the present invention.

FIG. 3. provides an example of what user-generated content (UGC)-containing product promotions according to the invention might look like. In this embodiment, the UGC 123 is a web page 300 containing user-created text 301. In this case the text describes how a DIY (Do it yourself) project was completed; this might be a common type of posting on a homeowner's social network. Additionally, the creator to the page added two tabs labeled "Recommended Tools" 302 and "Supplies" 303. On these tabs are placed text, tabular data, or (as in the example) images of products that were found useful to the author. It is clear that this is one natural form of mixing user-generated content 123 with product placements (i.e., advertisements). Others who want to replicate the success one UGC author achieves may well want to know what particular tools and supplies were found the most useful, and it would be convenient for such users to be able to click on the items he does not already possess and have them effortlessly shipped to his home in time to start the project on the weekend.

Figure 4:
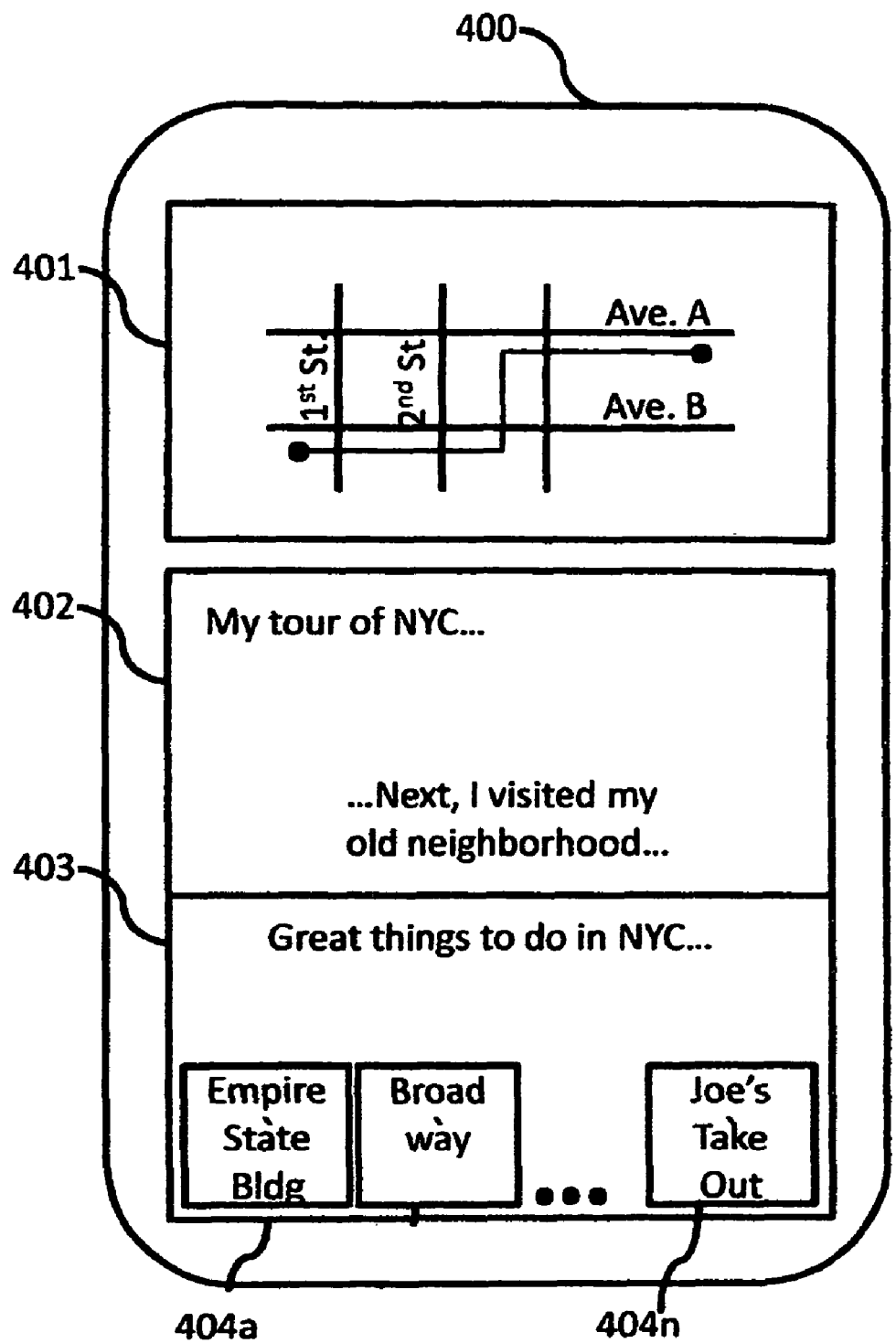
FIG. 4 is an example of a mobile phone based instance of the present invention.

FIG. 4. provides an example of another embodiment of the invention. In this embodiment, user-generated content is viewed on a mobile phone or personal digitals assistant (PDA) 400. A member of a virtual community has created her own content comprising a guided tour of New York City, including a map of the tour as she conducted it 401, a narrative of the tour 402, and a selection of "Great things to do in New York" 403. The items (404a through 404n) are product placements selected by the content creator to enhance the value of her guided tour content by allowing viewers, as they follow her path through the city, to select and purchase additional activities without having to leave her content. Note also that the content creator could leverage the fact that many PDAs and mobile phones today have Global Positioning Systems (GPS) receivers and can track where the user is in the city very accurately. This can be used to move the map as the user walks the tour, but it can also be used to change the promotions offered 403 based on where the user is. Such location-based product promotions within UGC 123 are an extremely potent form of UGC-based advertising. While location-based services are emerging rapidly in the marketplace, and in particular while leveraging location information in mobile applications is known in the art, the combination of this capability with the unique embedding of product promotions within user-generated content 123 (the object of the present invention) is new. Each item (404a through 404n) represents a recommendation of a product (or service—these terms should be understood to be interchangeable throughout this specification) by a person whom the user is likely to trust more than a mass advertiser because the user is a member of the same virtual community as the content creator. Thus this location-based advertising example represents an extraordinarily precise targeting of an advertisement, and is thus one for which advertisers will in general be willing to pay a premium.

Figure 5:
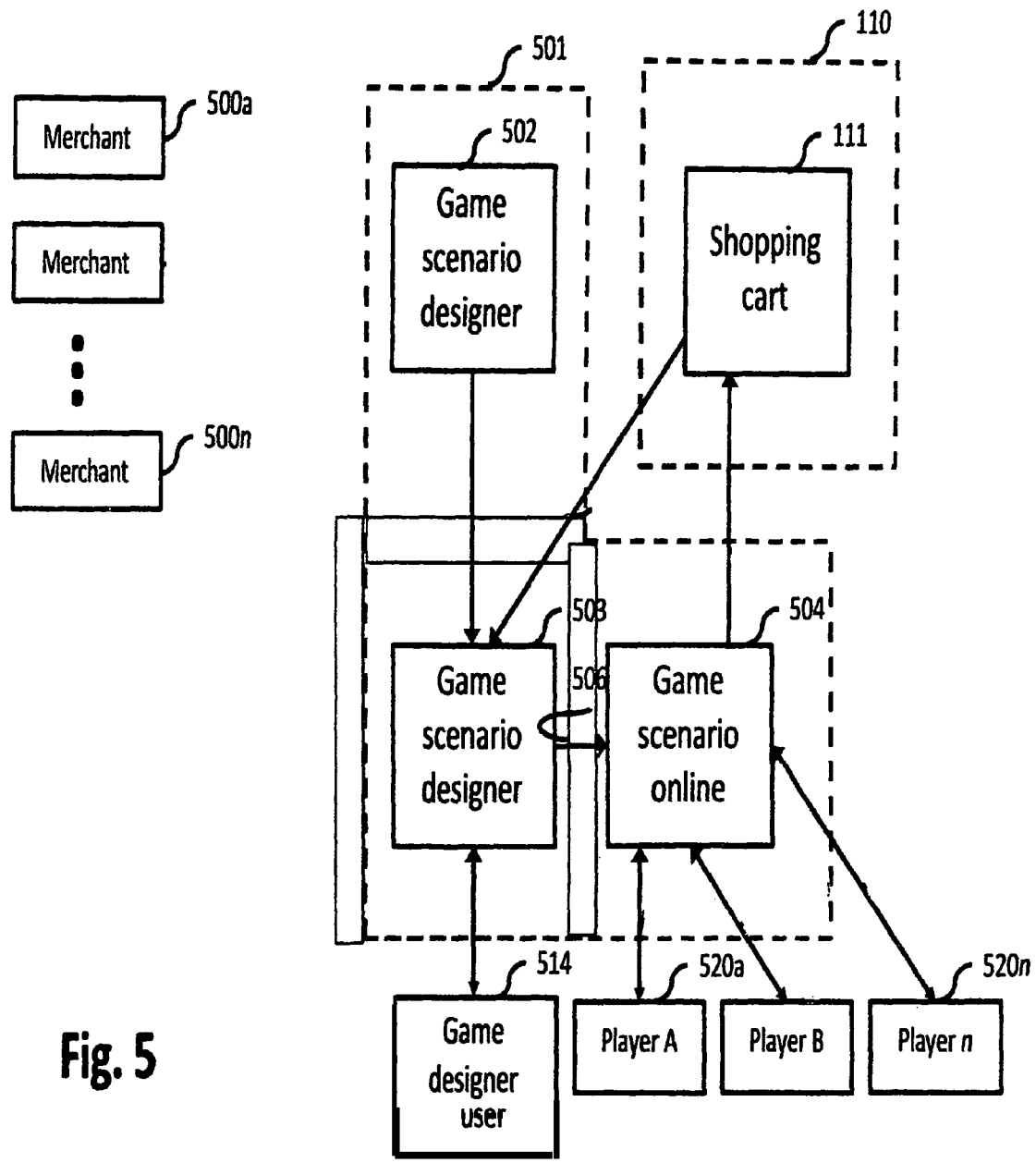
FIG. 5 is another example of use of the present invention, as a means for monetized user-generated content in a multi-player online gaming environment.

FIG. 5 is yet another embodiment illustrating an exemplary use of the invention to monetize user-generated content 123. Merchants (500a through 500n) make products available, as before, for promotion by members of a virtual community via a universal shopping cart 111. In this case, the virtual community is an online gaming community (514 and 520a through 520n) which shares an interest in games produced by game company 502, specifically the game domain 501. Optionally, the merchants could contract with the gaming company 502 to promote their products in the game domain 501, or they could upload product information directly to the universal shopping cart 111 as before. The gaming company provides a game scenario editor 503 tailored to the domain 501, through the use of which game designer users 514 can design custom scenarios that can be deployed 506 and then viewed online 504 by players (520a through 520n). The game designer user 514 can be a player as well, or she could be a specialist member of the virtual community who designs high-end scenarios full-time. But as in other embodiments of the invention, by gaining the ability to embed product promotion from merchants 500 into her scenarios, the game designer user 514 gains access to a valuable new revenue stream and a means of enhancing game play. One of the benefits the inventors foresee for the monetization of user-generated content 123 is illustrated in this last comment—when advertisements are inserted by trusted members of the virtual community in order to enhance the experience of using the virtual community, the ads are likely to be viewed positively rather than as a burden (which is how people generally view advertising). People are consumers by nature, and they appreciate being well-informed, so when useful information comes to them in a venue they enjoy, from sources they trust, buyers are likely to appreciate sellers for doing them a service. This upending of the traditional view of the role of advertisers as mass manipulators is important. The product promotions placed within their user-generated content by members of a virtual community are likely to not be viewed as advertisements at all by their viewers, but rather as welcome sources of information and hassle-free purchasing. To make this point clear, in this example the products being sold might be game accessories, books, and items that are closely tied to the thematic content of the game, and these are items that players of the game would enjoy seeing in the game; real-world consumption becomes part of the alternate reality (especially when considers virtual worlds, a specialized kind of massively multiplayer online role-playing game that could have promotions added in as shown in FIG. 5).

Figure 6:
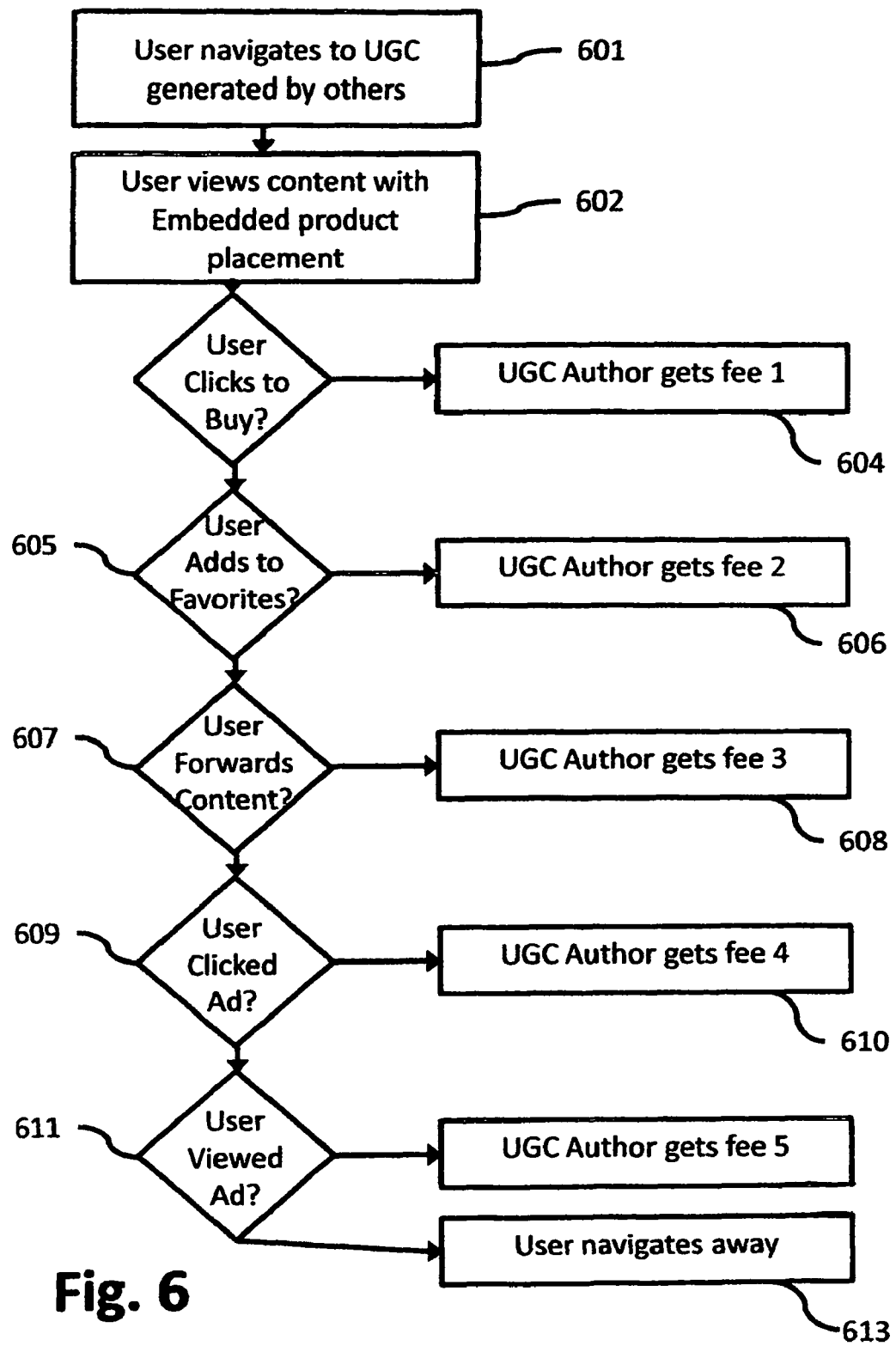
FIG. 6 is a process flow diagram of a financial transaction conducted according to an embodiment of the present invention.

FIG. 6 shows an example of how use of product placements in user-generated content can result in monetization of that content for its creators and for the operator of the virtual community 120. After a user (125a through 125n) navigates 601 to user-generated content created by other users, and selects a page or view that contains product placement text, images or videos 602, then a series of questions can be continuously evaluated until such time as the user leaves the site entirely 613 (although, as noted above, if a user returns later and buys a previously viewed product, then the UGC author would be entitled to some set fee, called Fee 1 604). Typically, this Fee 1 would be variable based on the value of the product sold, although it does not need to be. Other formats might include a fixed fee (for items of generally low cost) or fees based on level of sales achieved by the creating user for the month, or quarter. It should be appreciated that there are any number of ways one might choose to calculate the fee; what is essential here is that the user (and the virtual community site/operator, out of whose fee the creating users' fees are paid in most cases, although again this can be done in several ways according to the invention) gets a monetary reward for selling the product. Similarly, if the user adds an item to his Favorites 605, or otherwise marks it for future reference, a different, generally lower, Fee 2 606 may be paid optionally to the content creator. Similarly, if a user forwards the product to another member of the social network 607, the creator of the UGC 123 where the product was viewed can optionally be paid a Fee 3 608 by the virtual community operator. In similar fashion, in an exemplary embodiment, when users click on a product placement to view details 609, or when a user simply views a product placement 611, the content creator may optionally be paid Fee 4 610 or Fee 5 611, respectively. It should be understood that these fees are exemplary in nature, and some, none or all of them may in fact be paid, and others not listed could be paid, in order to provide the content creator with an inventive to promote products that are likely to be attractive to the members of the virtual community who are likely to view her content.

Figure 7:
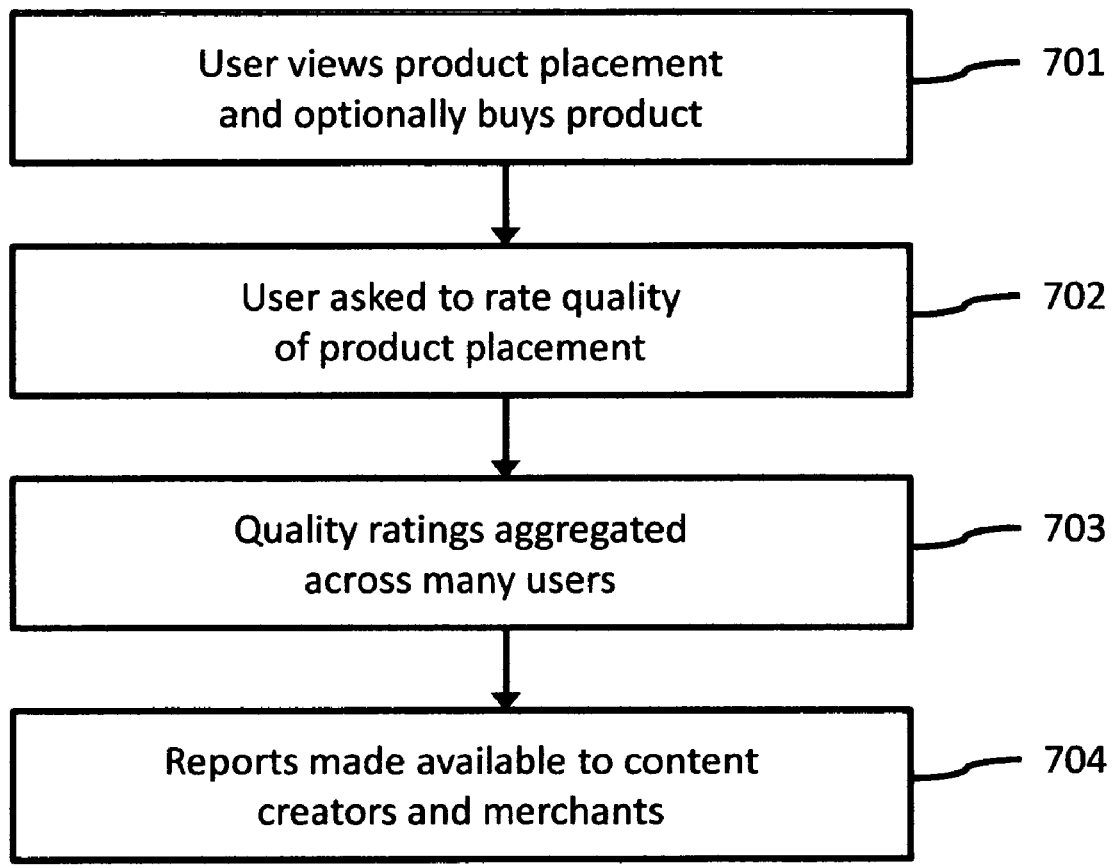
FIG. 7 is a process flow diagram of a product promotion quality rating process of an embodiment of the invention.

FIG. 7 shows a product placement quality rating process of an embodiment of the invention. It would be extremely useful for a content creator to know which promotions were the most successful, and further to understand whether lack of success is due to lack of interest in the product or, more seriously, due to user discontent with how products are being promoted. Similarly, merchants and optionally virtual community operators have a need to understand how effective their marketing activities into a virtual community are. Merchants may choose to pay more, or to limit availability of certain products for placement to content creators who achieve quality ratings above some minimum threshold. Accordingly, after users view product placements within user-generated content and optionally make purchase decisions 701, users may optionally be asked to rate the perceived quality of the product placement or placements they have just viewed 702. The request to rate quality can be done after every click-through, on a random sample basis, after every purchase, or based on any of a number of sampling techniques well established in the art. Quality ratings provided by users are then aggregated 703 and used to establish overall ratings for each content creator. Ratings can be based on several optional "dimensions", such as suitability of endorsed or promoted products for the target audience, accuracy of descriptions provided by content creators (if any), quality of products purchased and purchase, payment, and shipping processes, and so forth. Essentially any factor that can contribute to perceived quality, or lack thereof, of product placements, viewing, order and receipt processes, and of products themselves, can be rated in this way. Ratings can then optionally be provided 704 to merchants and content creators. A content creator might use these reports to refine methods of presenting product promotions, or to refine product selections. Merchants can use this data, as mentioned, to refine their marketing efforts through virtual communities. Also, optionally feedback scores can be provided to viewers of UGC 123 in the virtual community, for example by displaying information such as "this member's quality score is 97%, with 32 responses" when a product placement is selected for detailed viewing. This reputation system is similar to others known in the art, for example on large auction and ecommerce sites; an additional element here is not so much how data is gathered or used but more what the gathered data represents—it reflects the evolving reputations of members of the virtual community as endorsers of products. It is anticipated by the inventors that merchants may well be willing to pay more for promotion of their products by content creators who in effect develop reputations as "product gurus to be trusted" within their communities.

Figure 8:
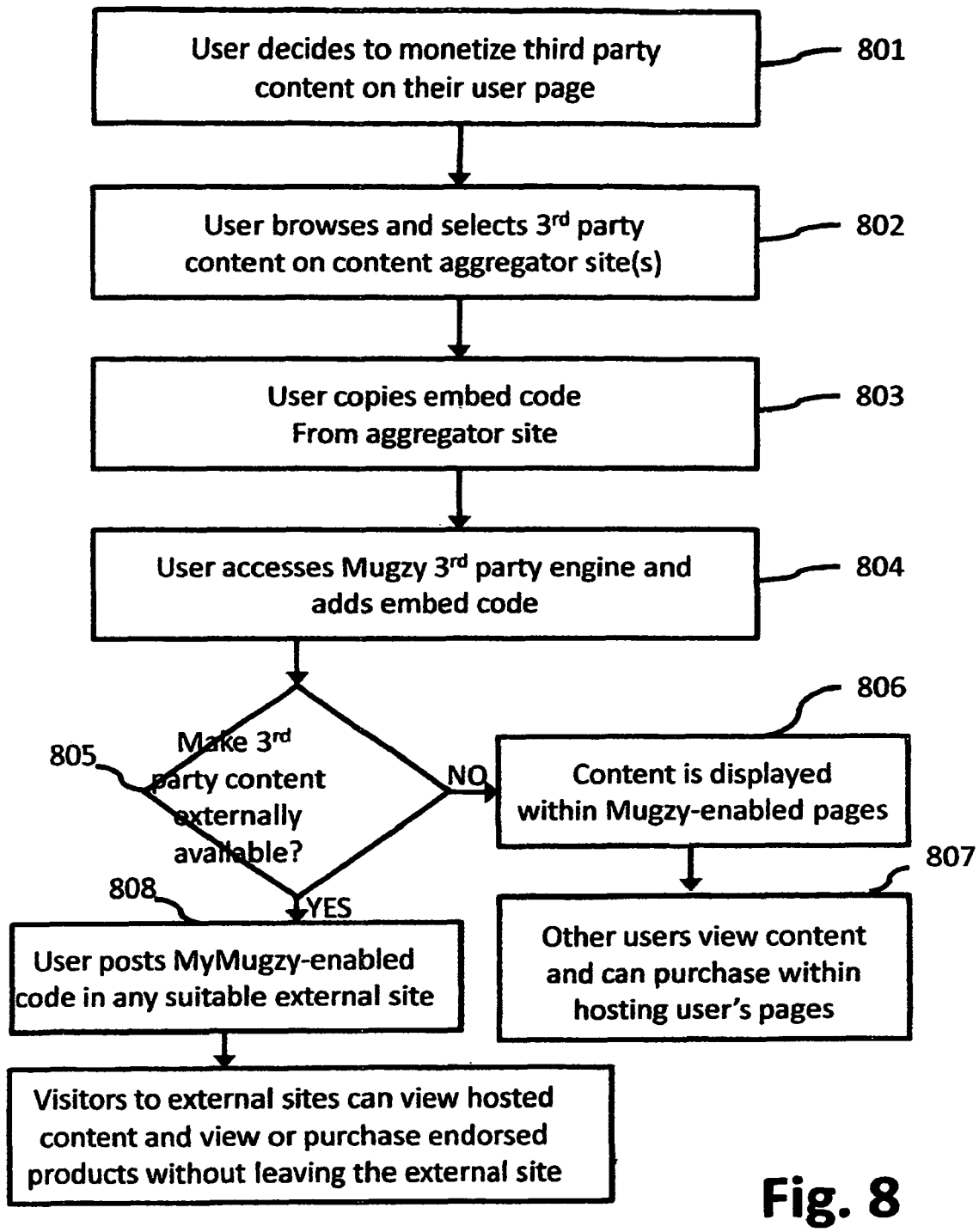
FIG. 8 is a process flow diagram of monetization of third party user-generated content according to an embodiment of the invention.

FIG. 8 shows a method, according to an embodiment of the invention, for monetizing third party content. Many users of virtual communities may desire not only to endorse, or advertise, products in their own UGC 123 as described above, but also to endorse products within or connected with third party content such as is commonly provided by content aggregators such as YouTube®, FlickR®, Revver®, and the like. In an embodiment of the invention, such users decide to monetize third party content on their own pages in step 801. Pages could be profile pages within a virtual community 120, scenarios within a gaming domain 501, personal blogs, personal websites, or any online location under control of the user. Under control here means sufficiently under control of a user to enable carrying out embodiments of the invention, and does not necessarily imply complete control or ownership of the online location by the user. Having decided 801 to endorse products within or in association with third party content, the user in step 802 browses one or more content aggregator sites to select third party content which can be used in conjunction with endorsements of products (or services). This step is exemplary of the underlying step, which is that a user selects some content for display on some location under their control as described above, potentially at least for the purpose of endorsing and possible selling products and services to others. Other examples of content selection include, but are not limited to, selecting content from a storage device such as a local hard drive, a hard drive on an accessible network, a removable "thumb drive", a published CD or DVD, and the like. Once content is selected, a user then copies embedded code from the content aggregator site in step 803. Such embedded code, as described above, is designed for insertion into online locations provided with a suitable insertion point, much as is accomplished in the art with embedded code for advertising networks. Again, this step is exemplary, as other means can be used within the scope of the invention to enable the embedding of the third party content in online locations under user control. For example, if a user intends to host content from a storage device and runs her own web site, she could add code written for the express purpose of inserting such content directly into her web site source code. Alternatively, readily available software modules, or widgets, that enable streaming media could be inserted into an online location under control of a user, and content could be loaded directly into such a software module directly from a storage device. In step 804, users access a server operated by virtual community 120 or service provider 110 that hosts software that acts as a third party endorsement engine. This software and its associated server allow users to upload the embed code obtained in step 803 and to select products to endorse from among those made available for endorsement by merchants 100. Alternatively, in order to enable endorsement of products in or with third party content, in step 804 users load code obtained in step 803 into a software module provided by a service provider 110, for example the MyMugzy® widget provided by Pure Verticals, Inc. The MyMugzy widget, or equivalent software modules, is adapted to contain code obtained in 803 and to interact with a universal shopping cart 111, thus linking the third party content and access to the universal shopping cart in a single software module that is suitable for inclusion in online documents or locations.

In a subsequent step (805), users of an embodiment of the invention choose whether to make third party content accessible outside of the current online location. Alternatively, when users are conducting monetization of third party content within a virtual community, steps 801 through 804 are performed on a suitable page or in a suitable software module hosted by service provider 110, which as before could either be the operator of a virtual community 120 or could be providing services on behalf of a virtual community 120, and step 805 is the service provider's or virtual community's selection of whether users will be allowed to make third party content accessible outside of the virtual community 120. The decision in step 805 may optionally be made based on specific rules or terms enforced by the owner or aggregator of the content selected in step 802. Such rules or terms may be contractual or may be enforced through the inclusion in embedded code downloaded in step 803 of software routines which prevent redistribution of content beyond the location for which it was originally released. For example, a content aggregator or content owner can embed code which is rendered at the time of the selection in step 802 and which only allows selected content to be hosted at or viewed from the location from which a user selected the content. Alternatively, a content aggregator or content owner could provide a list of online properties or domains within embedded code provided in step 803 to users, and only content hosted at one of the online properties or domains specified in a list so provided would be functional. In another example, a content aggregator or content owner could include code means in embedded code provided to users in step 803 that, when users attempt to view content associated with the embedded code, communicates over a network such as the Internet with a specified service or server connected to the network and requests permission to display the content to the requesting user. In this example, the provision of permission, and possibly the attachment of usage conditions to such permission, can be based on a number of factors that could be included in the request, including but not limited to the identity of the requesting user, the membership status of the requesting user in some group or demographic segment, the time of day, and so forth. It will be appreciated that quite sophisticated mechanisms can be established by content owners or content aggregators, or both, to control when and how their content is displayed, and to control whether product endorsements are to be allowed to be inserted into or associated with their content, how those endorsements can be performed, who can endorse products, and what products or vendors can be endorsed. For instance, a content owner could prevent competing content creators from advertising their content to potential buyers from within or adjacent to the content owner's content. If content export is not allowed in step 805, then in step 806 the content is displayed within Mugzy-enabled pages within the virtual community 120 or within the website or domain to which the content was limited in step 805, and in step 807 other users of the virtual community or domain in which the content is hosted view the content and associated product endorsements and can optionally purchase products from within the hosting user's pages or locations. If content export is allowed in step 805, then in step 808 the user posts or uploads embed code for the MyMugzy widget, or equivalent software modules or widgets adapted to contain the embed code from step 803 and suitable product endorsements, to one or more target external sites or online locations adapted to receive such embed code. The embed code can be in JavaScript or any other suitable form that is commonly accepted by online properties such as virtual communities, blogging networks or sites, consumer feedback sites, and the like. Note that the decision in step 805 is not necessarily an either/or decision; in some cases users will be allowed to export the third party content and associated product endorsements and also to host them within the virtual community or service provider or user-controlled location at which the decision 805 was executed. For example, a user may desire to display a video from a favorite coffeehouse musician and endorsements for one or more of the musician's published CDs. The user can do this from her profile page in a social network or other virtual community, for example by following a link provided by the social network and then browsing third party content to find a suitable video. The user can then select products for endorsement, in this case CDs from the favorite musician, using the Mugzy third party engine provided by the social network. Once the third party embed code and product endorsement code is obtained and linked one to the other, the user can add the video for viewing under a "music I have recently found" heading on her Mugzy-enabled profile page within the social network, and she can also obtain the equivalent MyMugzy embed code, which in effect wraps around the full functionality provided on the Mugzy-enabled personal profile page in an embeddable software object that is invoked when the MyMugzy embed code is itself invoked from an external location. She can then post or upload this MyMugzy embed code on her profile pages in one or more additional virtual communities, as well as on her own personal home page and her own personal blog. In fact, the MyMugzy embed code can be embedded in media files provided with insertion points for embedded code and distributed on a CD or removable storage device to particular individuals. Those receiving individuals could then, when playing the content on the CD or storage device at their leisure, view and purchase product endorsements from the endorsing user whenever the viewing is conducted while online (the MyMugzy embed code, like all embed code, requires access over the Internet to one or more locations specified in the embed code; in this case the original virtual community's third party engine). Once MyMugzy code embed code is uploaded to a suitable external web site, virtual community page or other online location (or it is loaded into a suitable network-connected playback device if the code is loaded on a CD or portable storage device), visitors to the external site (or users of the CD or portable storage device) can view the hosted third party content and view and optionally purchase, recommend, rate or comment on products endorsed in or adjacent to the hosted content. In a preferred embodiment of the invention, viewing users do not need to leave the hosted content in order to view or purchase endorsed products; the code necessary to connect back to the universal shopping cart is included in the MyMugzy embed code and the entire viewing, selection and checkout process (or any portion thereof) can be performed from within the control of the MyMugzy widget without leaving the associated third party content.

Figure 9:
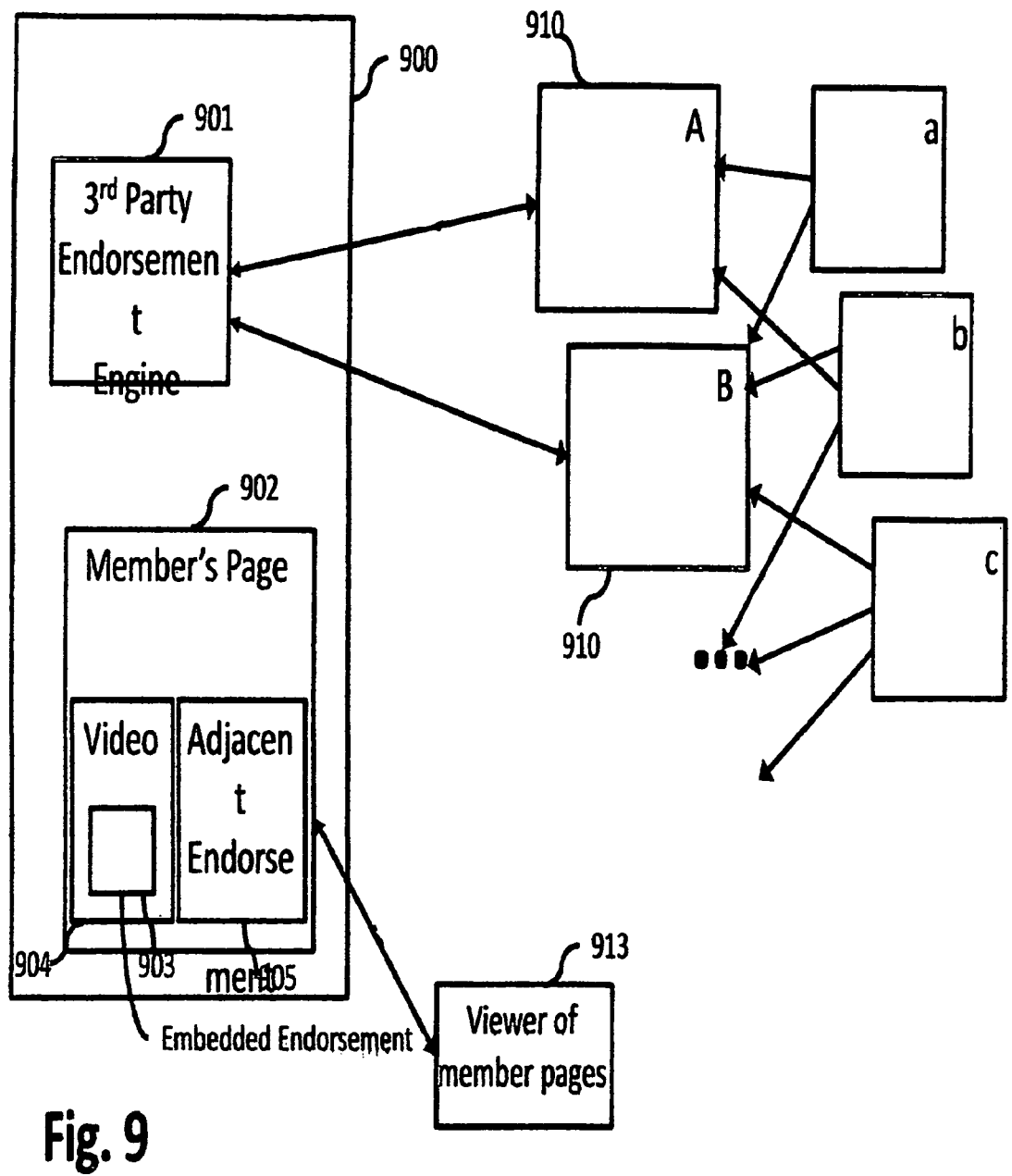
FIG. 9 is a block diagram of an embodiment of the invention that enables the monetization of third party user-generated content.

FIG. 9 illustrates a preferred embodiment of the invention in which viewers of a Mugzy-enabled site 900 view third party content while viewing a user's page 902 on the site. The user responsible for page 902 accesses, via a third party endorsement engine 901, third party content available at one or more content aggregator sites 910. Third party content 904 is provided by content creators or owners 911, who optionally upload their content to one or more content aggregation sites 910. Content creators 911 can upload the same content to one or more aggregators, and users of the Mugzy-enabled site 900 can access third party content from one or more aggregators. Additionally, not shown in FIG. 9 but similarly exemplary of the invention, users can access third party content directly from the content creators 911 without the intermediary services of a content aggregator 910. Users responsible for user-managed pages 902 on site 900 access a third party endorsement engine 901 not only to browse and select third party content, but also to interact with a universal shopping cart 111 in order to select products or services for endorsement within 903 or alongside 905 the third party content. In an exemplary embodiment, the third party content is a video 904, and products are endorsed via embedded endorsements 903 which can be inserted at defined insertion points within video 904 or can be viewed by mousing over hot spots in the video window. Hot spots can be made active throughout the length of the video or only during certain portions of the video, as specified by the managing user in the third party endorsement engine 901. Alternatively, endorsements 905 can be deployed adjacent to, or close to, the third party content according to the invention. Visitors 913 to the Mugzy-enabled site 900 may view user-managed pages 902 and in particular they may view third party content 904 that is hosted thereon. While viewing third party content, visitors 913 are optionally shown one or more embedded, adjacent or nearby product endorsements (903 and 905). At any time while viewing the third party content, viewers may elect to click on or otherwise select one or more of the product endorsements in order to view more details about the product or products being endorsed. The additional information, and the ability to select endorsed products for addition to a universal shopping cart, is managed by the third party endorsement engine 901.

Figure 10:
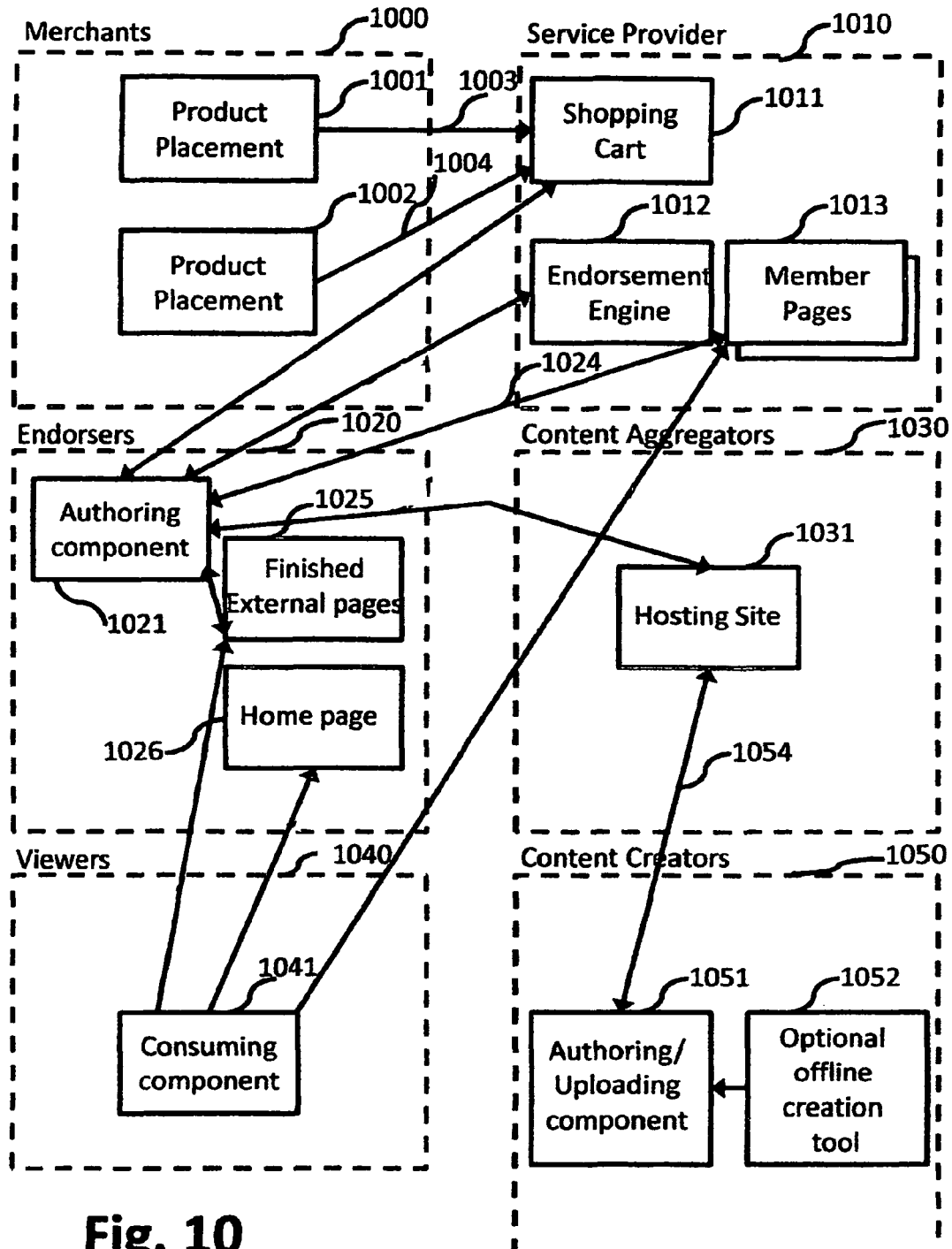
FIG. 10 is a block diagram of an embodiment of the invention showing the relationships among the various parties involved in monetization of third party user-generated content.

FIG. 10 shows another embodiment of the invention more particularly pointing out an exemplary set of relationships between the various entities involved in monetization of third party content. Not all the entities shown in FIG. 10 are required in every embodiment of the invention, as these entities may interact in various combinations, each leading to the endorsement of merchants' products by users who endorse the products in conjunction with displaying third party content and make possible the purchase of said products by other users while they are viewing said third party content, according to the present invention.

In one such embodiment of the invention illustrated in FIG. 10, a service provider 1010 provides a universal shopping cart 1011 to enable merchants 1000 to make product placements 1001, passing product information about products that are available for sale through the service provider 1010 using interface 1003 to the universal shopping cart 1011, as well as a means for receiving sales transactions 1002 from the universal shopping cart 1011 via another interface 1004. It should be noted that the interfaces 1003 and 1004 need not be separate, but the functions of product placement 1001 and sales transactions 1002 could be carried out over a single interface between the merchant's 1000 systems and the universal shopping cart 1011. This is in general true of the many interfaces described in various embodiments of the invention—the precise arrangement of interfaces is not integral to the invention, but rather the exemplary combinations of functionality enabled to be made through use of the interfaces is essential to the invention.

Service providers 1010 are common on the Internet today and could include one or more of virtual communities, web hosting facilities, internet service providers, and the like. Service providers 1010 provide endorsers 1020 with a variety of services intended to enable them to monetize third party content by endorsing products within or associated with the third party content. Among these services, service providers 1010 provide in an embodiment of the invention the capability to endorsers, using endorsement engine 1012 via interface 1024, to incorporate third party content obtained from hosting site 1031 operated by content aggregator 1030 into user-managed pages 1013, 1025 or 1026. The third party content is generally created separately from the content aggregator 1030, with content creators 1050 creating content according to their goals and desires. Content creators create content optionally using an offline content creation tool 1052 and then uploading the content to one or more content aggregators 1030 using an authoring and uploading tool 1051 that is connected via interface 1054. Alternatively, content creators can use an online authoring and uploading tool 1051 to create content directly online and to submit it to one or more content aggregators 1030 using interface 1054. There are a multitude of well-known offline and online content creation tools, and many content aggregators, and the creation, uploading and hosting (in a content aggregator) of user-generated content is very well known in the art. Service providers 1010 also provide services directly to viewers 1040 of hosted third party content by enabling them, when viewing user-generated pages 1013, 1025 or 1026 using a consuming component 1041, to receive and view product endorsements embedded in or adjacent to third party content that is provided as part of user-generated pages 1025, 1026 or 1013, to view product details, add products to their personal universal shopping cart 1011, and purchase items directly through the MyMugzy or equivalent widget utilizing the services of the universal shopping cart 1011 without leaving the page they are viewing.

While not shown in FIG. 10, which is exemplary but not limiting, endorsers can also obtain content directly from content creators without using the services of a content aggregator 1030, in one of several ways. Content creators often make their content available for download from their own web pages or personal blogs; content from these sources can be downloaded either in the form of media files that can be loaded directly into readily available streaming media hosting software that can in turn be embedded into user-generated pages 1013, 1025 or 1026. Alternatively embed code can be obtained from the content creator directly in a process directly analogous to that used to host content that resides on content aggregator sites. And, as discussed above, there are many means for delivery of third party content directly to endorsers, such as on storage devices or via email.

Endorsers 1020 are thus provided with a rich variety of means of obtaining and hosting third party content and monetizing that content by embedding or closely associating (by adjacent or close placement on user-controlled pages) product or service endorsements. In an embodiment of the invention, endorsers 1020 use authoring components 1021 to generate pages 1013, 1025 or 1026, or combinations thereof. Endorsers connect via interface 1024 from an authoring component to an endorsement engine provided by service provider 1010. Endorsers can obtain third party content directly from content creators 1050 or content aggregators 1030, and obtain embed code or media files which are then uploaded to the third party engine 1012 of service provider 1010. Endorsers may, according to the invention, browse products that are eligible for endorsement or promotion in service provider 1010's environment either by connecting directly to a universal shopping cart 1011 provided by the service provider or by browsing available products in the third party endorsement engine if service provider 1010 chooses to configure the third party monetization system accordingly. Endorsers, after selecting third party content and appropriate content embed code, and after selecting products or services to endorse, receive complete embed code to enable the embedding of a MyMugzy or equivalent software module directly into a finished external page 1025 or a personal home page 1026; alternatively the endorser receives embed code adapted for inclusion in pages belonging to, or managed by, the endorsing user within the service provider's environment (in these cases the use of an embedded software widget is optional, as the endorsement engine, the universal shopping cart and the user page 1013 are all within the domain, or technical and business operating environment, of the service provider 1010). According to an embodiment of the invention, endorsing users 1020 are able to monitor and change their endorsement settings directly through the same user interface embedded in pages 1013, 1025 or 1026 as is used by viewers 1040; since viewers who want to buy products and endorsers who want to modify endorsements will need to be identified before they can conduct such transactions, the universal shopping cart provides an authentication service that is accessed directly by user pages within the service provider environment, or via the MyMugzy or equivalent widget (under control of the embed code) when viewers access product endorsements from external pages 1025 or 1026. Thus endorsing users are able to view, monitor and modify their endorsements and third party content from within the hosting page, and viewers are able to view, rate, comment on, and purchase endorsed products from within the user-managed pages 1013, 1025 or 1026.

Figure 11:
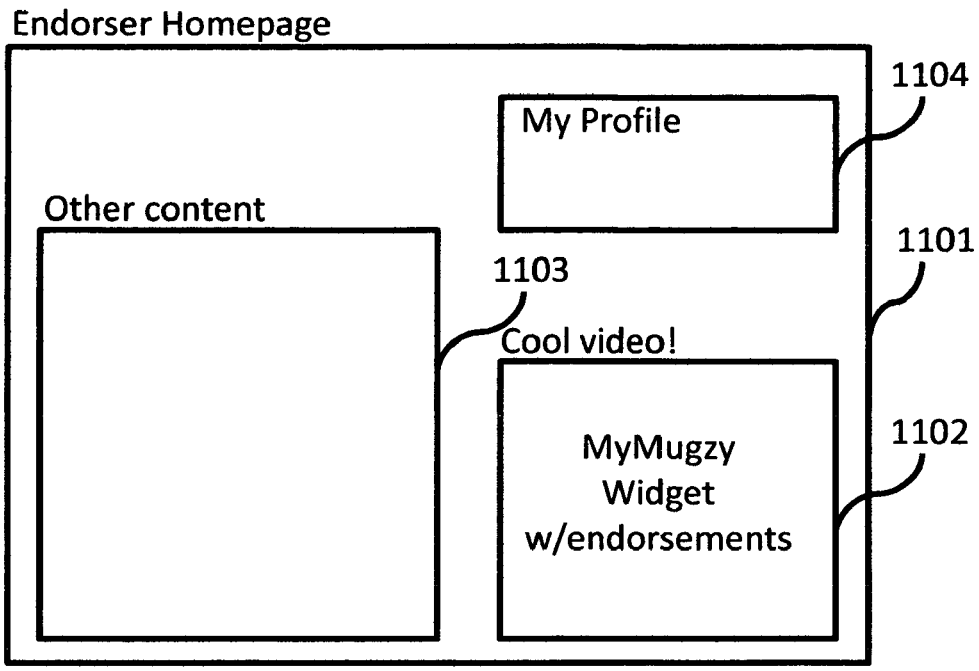
FIG. 11 is an example of an endorser home page according to an embodiment of the invention.

FIG. 11 provides an exemplary illustration of an embodiment of a user-controlled online page, in this case an endorser's home page 1101 (corresponding for example to element 1025 in FIG. 10). Endorsers may put any content they desire on such a page, such as a personal profile section 1104 or other content 1103 that does not use third party content. In an embodiment of the invention, a user can place a third party video on her home page 1101 using the MyMugzy widget 1102. As described above, this or equivalent widgets provide a container for hosting the embed code or media file of the third party content (in this example, a "cool video"), and for hosting the embed code for the product/service endorsement functionality.

Figure 12:
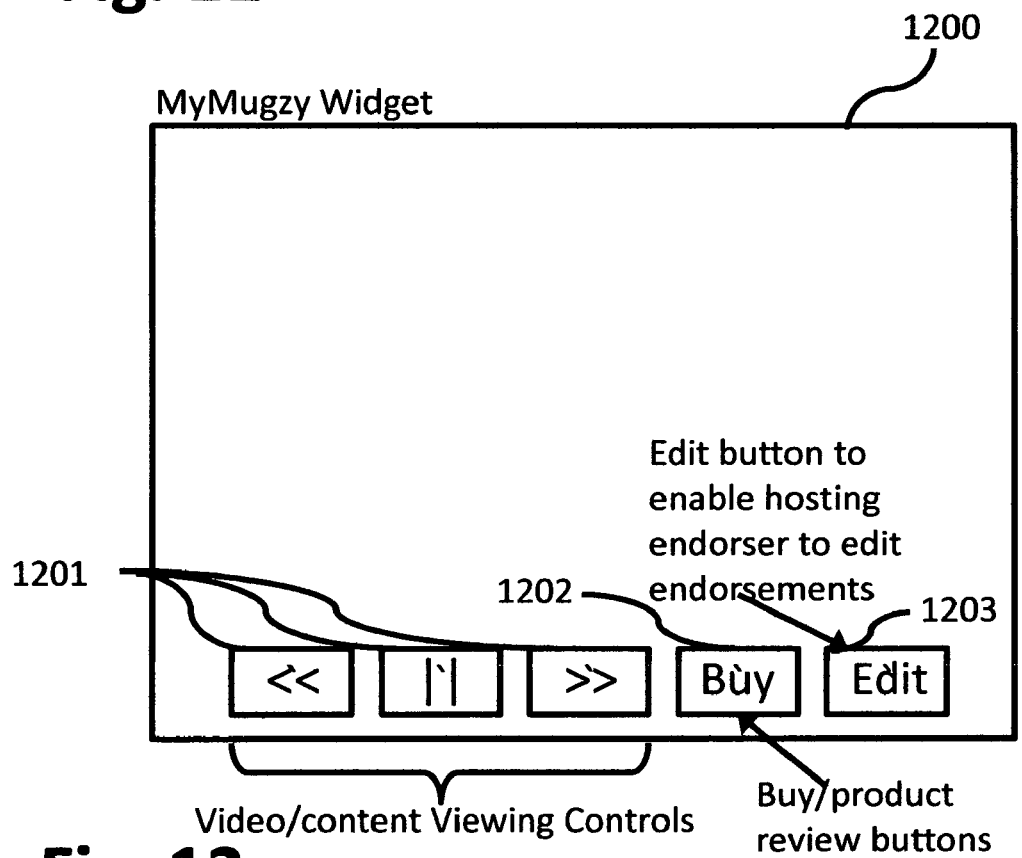
FIG. 12 is an example of an embeddable widget according to an embodiment of the invention that allows for presentation of third party user-generated content with embedded product endorsements.

FIG. 12 provides a detailed view of an exemplary embodiment of a MyMugzy widget 1200 of the invention. The widget contains either a media file containing third party content or embed code which retrieves the third party content when requested by a viewer, and it contains embed code that connects back to the universal shopping cart 1011 and allows a visiting user to view product or service endorsements, review or comment on endorsements or endorsed products or services, rate endorsements, endorsers, or endorsed products or services, and purchase products or services from directly within the widget 1200. In a preferred embodiment, media viewing control 1201 are provided to allow viewers to view third party content in the widget and to control how that content is viewed (for example, by providing pause, forward and back buttons as shown). Additionally, in a preferred embodiment of the invention, buttons are provided to Buy 1202 endorsed products or services or to Edit 1203 product/service endorsements (this feature is only accessible to the endorsing user). Product or service endorsements may be made visible to the viewer in a number of ways according to the invention, including pop up endorsements that are displayed when a viewer mouses over a hot spot in the widget (hot spots may be visible to prompt the user, or invisible so that users can be encouraged to mouse over items in the video in which they are interested, said items optionally being associated with hidden hot spots that cause an endorsement to pop up). Alternatively, endorsements can, at the discretion of the endorser, be inserted at fixed insertion points in the third party content (although typically this approach requires that the content creator has previously inserted such an anchor or insertion point in his content and made it available to third parties for ad insertion). It will be appreciated that there are many ways in which controls or buttons can be arranged, and many combinations of controls or buttons that can be provided to viewers. Buttons may be always present, or they may only "appear" (become visible) when they are available for use (for example, an edit button may be invisible until and unless a visiting user properly identifies herself as the endorsing user who is hosting the widget, to prevent other viewers from attempting to edit the endorsements or from being confused by the extraneous button).

Figure 13:
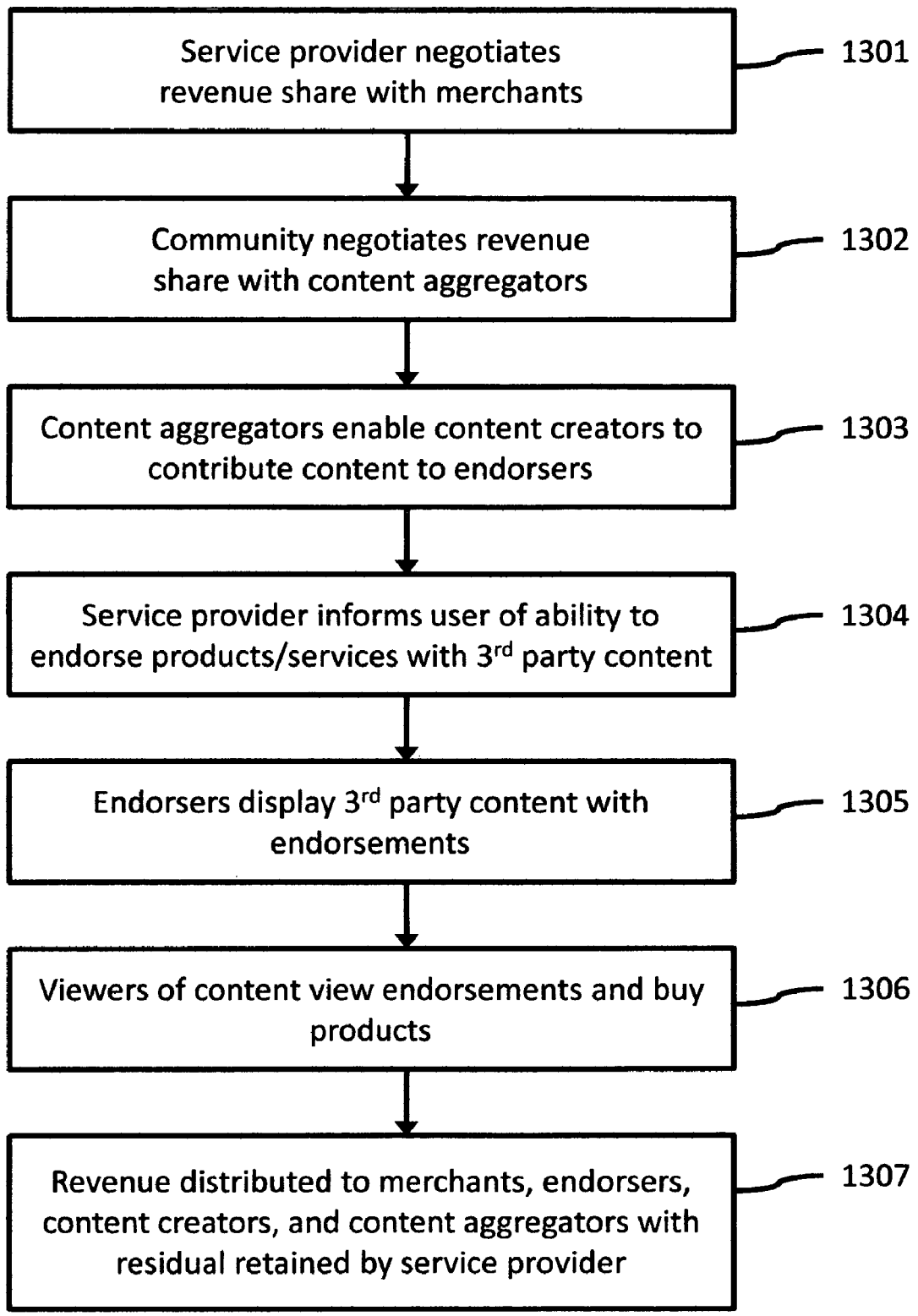
FIG. 13 is a process flow diagram of an exemplary financial arrangement conducted according to an embodiment of the invention.

FIG. 13 shows an example of how use of product placements in third party content can result in monetization of that content for its creators 1050, its aggregators 1030, service providers 1010, and endorsers themselves 1020. In an embodiment of the invention, a service provider 1010, in step 1301, negotiates revenue share arrangement with one or more merchants 1010 and stores information pertaining to the agreed revenue share in a third party endorsement engine

1012. In step 1302, the service provider 1010 negotiates revenue share arrangements with one or more content aggregators 1030, and stores information pertaining to the agreed revenue share in a third party endorsement engine 1012. In optional step 1303, content aggregators 1030 enable content creators 1050 to make content available for use by endorsers 1020. This step is optional because the service provider could in an alternative embodiment provide a public online access point to the third party endorsement engine 1012 where individual content creators could agree to one or more available revenue share arrangements provided by the third party endorsement engine and then upload content directly to the third party endorsement engine without the involvement of content aggregators 1030 (or make it available for upload directly by endorsers). In step 1304, the service provider 1010 informs its users that they now have the ability to add third party content to their content pages, and that the abilities to endorse products or services that are described above for user-generated content are now available to them for third party content. That is, the use of third party content and associated product endorsements is promoted within the service provider's user base (and potentially used as an enticement to grow that user base as well as a means to monetize the base). In step 1305, interested users become endorsers, hosting third party content with associated or embedded product placements, promotions or endorsements. In step 1306, viewers of content, whether hosted in endorser pages 1013 within the service provider environment or on external pages 1025 managed by the endorser, or on endorsers' own home pages 1026, view associated endorsements and optionally buy products. In step 1307 revenue generated as a result of product or service sales made is distributed to merchants, endorsers, content creators, and content aggregators as agreed, with the balance being retained by the service provider. It should be recognized that, in addition to paying when sales are made, fees may be generated and shared as described above in description of FIG. 6 for product endorsements in or associated with third party content just as they can be with user-generated content. The key differences between FIG. 6 and FIG. 13 are that the content is generated by a third party rather than the endorser herself, and there are more parties to share any revenue or fees in the case of third party content than in the case of user-generated content; the kinds of fees (and indeed the manner of obtaining ratings, feedback and reputation scores described with reference to FIG. 7 above) are the same whether the content is user-generated or third-party generated, and the scope of the invention should be so considered.

Figure 14:
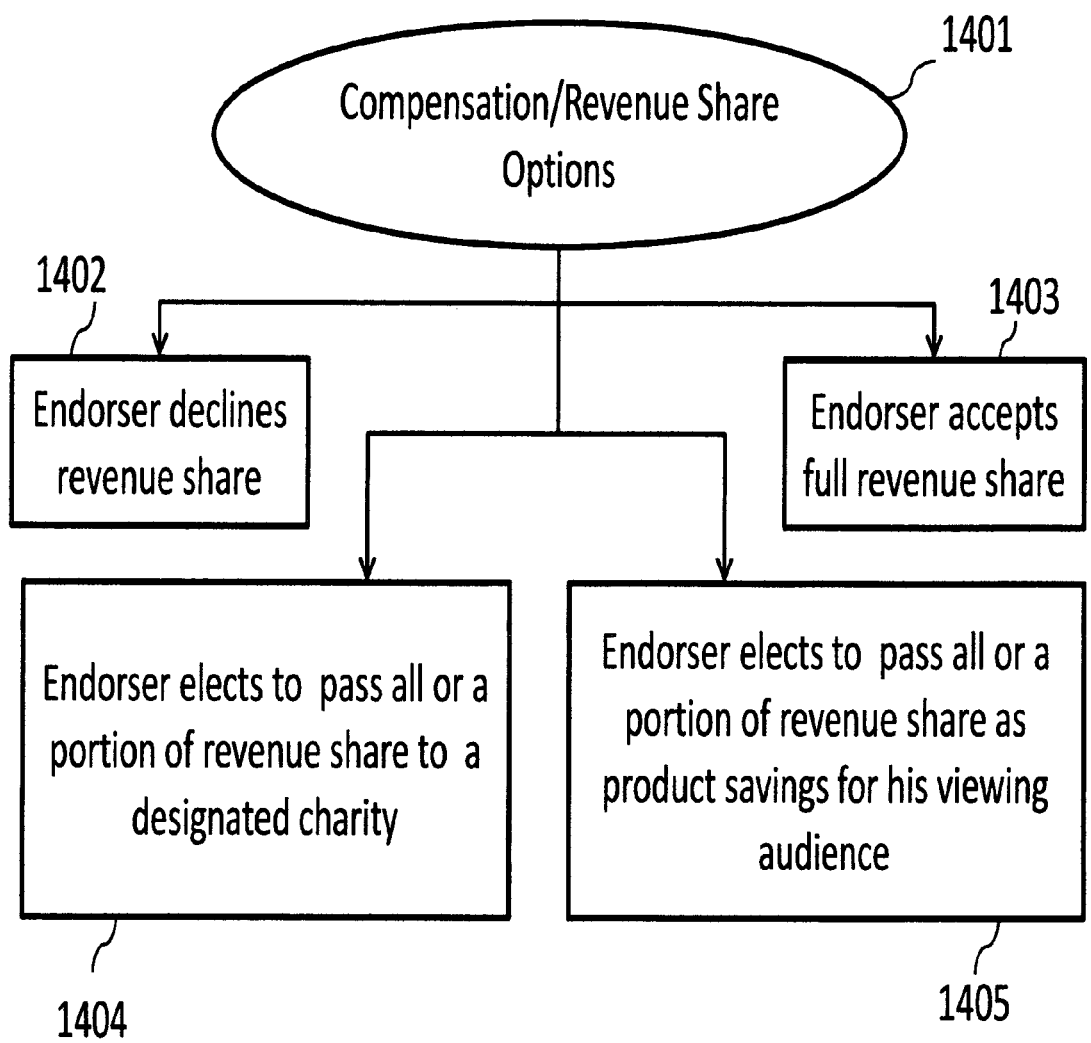
FIG. 14 is an example of possible compensation or revenue share options available to the endorser.

FIG. 14 illustrates examples of possible compensation or revenue share options available to the endorser 1401. In an embodiment of the invention, an endorser may decline revenue share entirely 1402. In this case his reward is advocating for his favorite brand and there is no monetary compensation. Alternatively, an endorser may elect to accept a full revenue share (monetary compensation) 1403 as previously agreed upon with merchant and service provider 1301. In other embodiments of the invention, an endorser may pass all or a specific portion of his monetary revenue share to one or more designated charities 1404. System approved entities such as non-profits and charities would be available for the endorser to select from within the system. In this case an endorser tells a brand what charity to donate his share to. In an embodiment, an endorser who designates all or part of his compensation to go to charity is granted loyalty points or other, non-monetary, recognition rewards as compensation while his preselected charity benefits monetarily. Another possible scenario in this flexible compensation model would be for an endorser to elect to pass all or a portion of his revenue share to his viewing audience in the form of a discount on purchased products 1405. In this case a discount would be applied to viewers of his page who purchased endorsed products. For example assume an endorser elects to pass 50% of his revenue share; for the purpose of this example further assume the 50% share for a product is $2.00. The price of the endorsed product is now discounted by $2.00 to viewers who make a buying decision from the endorser's page. The endorser also receives $2.00 in compensation. In other embodiments content creators, content owners, virtual communities or any others who may be due to receive a revenue share may also elect to allocate their share flexibly. For example they may elect to pass all or a portion of their revenue share to one or more preselected charities or to pass it on as product savings for their viewing audience in the form of a discount. In this embodiment these allocations are all executed automatically within the Universal Shopping Cart or MyMugzy widget.

Figure 15:
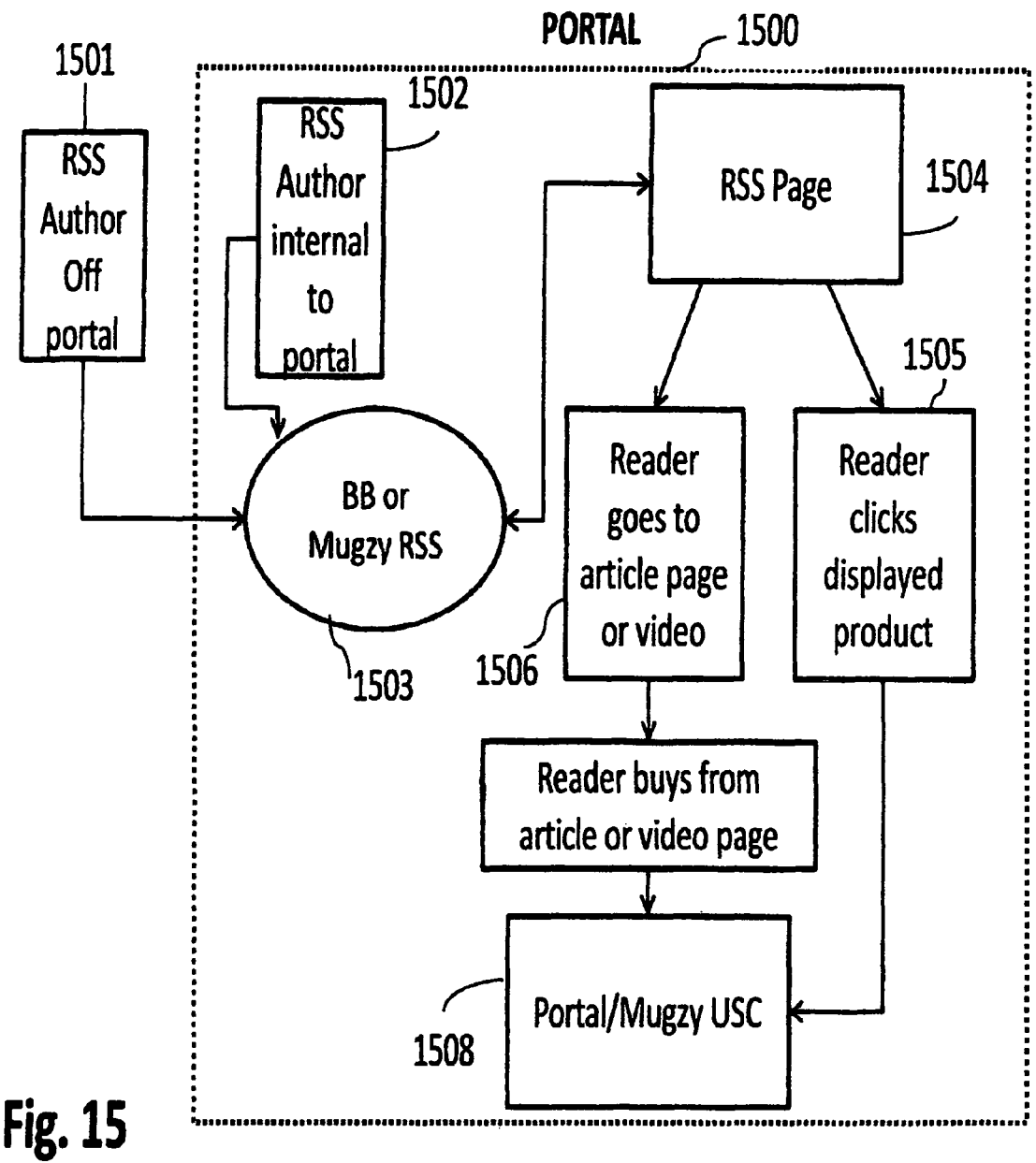
FIG. 15 is a block diagram illustrating an embodiment of the invention using the RSS standard technology to enable the syndication of endorsements along with associated content from within a virtual community or web portal.

FIG. 15 illustrates the use of the RSS standard technology to enable the syndication of endorsements along with associated content from within a virtual community or web portal 1500. Content authors can be located away from, or "off", the virtual community or web portal 1501 or internal to the virtual community or web portal 1502. In one embodiment, authors register with a virtual community or web portal and then take MyMugzy to their own web page or web site, as described herein. In another embodiment, authors use a virtual portal's hosted MyMugzy 1503 to publish, also as described above. In an embodiment of the invention, a toggle switch on MyMugzy allows an RSS publication option. Authors publish content and specify products to endorse and can either use merchant supplied promotions (ads) or they can provide their own endorsing content. These endorsed products are displayed on authors RSS page 1504. If a user accesses the content from an RSS reader such as Google Reader or any other RSS client, any linked endorsements will be retrieved along with the author's content. In this embodiment when a viewer buys directly from an RSS page 1505, he will be directed to the portal's Mugzy universal shopping cart (USC) checkout page 1508. In another embodiment a viewer goes to a content page 1506 from an RSS reader page. Content page 1506 is MyMugzy enabled and supports various content such as video, slide shows and text endorsements. If a viewer buys from this content page, the check out is self-contained in MyMugzy USC 1508.

Figure 16:
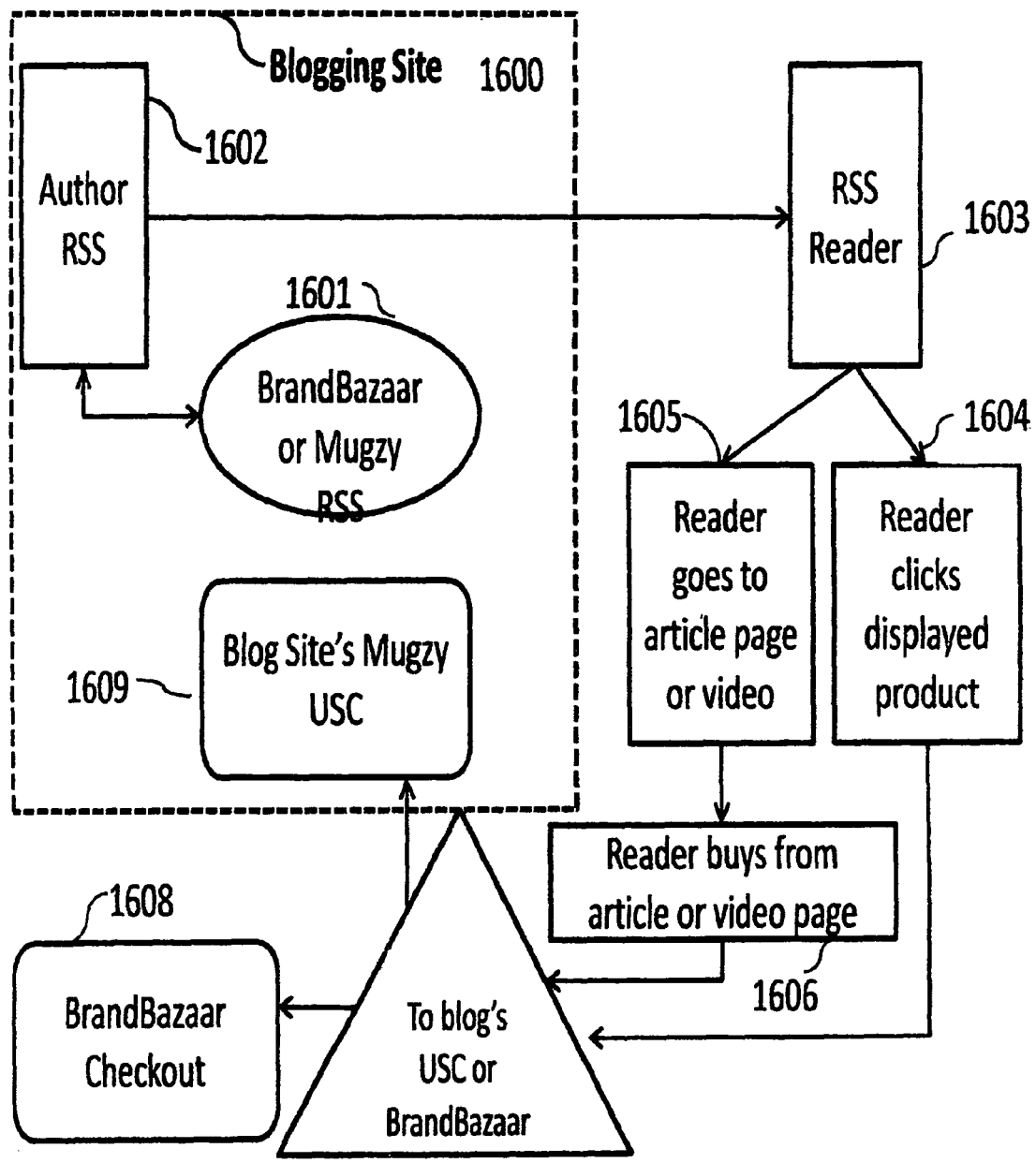
FIG. 16 is a block diagram of an embodiment of the invention using the RSS standard technology to enable the syndication of endorsements along with associated content produced within a blogging site or other content or site capable of allowing RSS subscriptions.

FIG. 16 illustrates the use of the RSS standard technology to enable the syndication of endorsements along with associated content from within a blogging site 1600 or any other content or location capable of supporting RSS subscriptions. RSS news authors can take their MyMugzy anywhere and write/endorse, and then publish their articles in all authorized RSS news outlets. In one embodiment an author registers with BrandBazaar and takes MyMugzy 1601 to their site page. Author then specifies products to endorse from BrandBazaar's OpenMarket solution and displays endorsed products on his RSS page 1602, 1603 along with his published content. An author can either use merchant supplied promotions (ads) or they can provide their own endorsing content. When a user accesses an author's content from an RSS reader, (such as Google Reader) any linked endorsements will be retrieved as well. In this embodiment when a viewer clicks a displayed product from the RSS page 1604 he will be taken directly to the BrandBazaar checkout page 1608. In another embodiment a viewer first goes to a specific content page 1605 (this content page is MyMugzy enabled and supports various content such as video, slideshows, articles, etc.). If a viewer then buys directly from the content page 1606 he will be taken to the blogging site's Mugzy universal shopping cart (USC) 1609 for check out.

Figure 17:
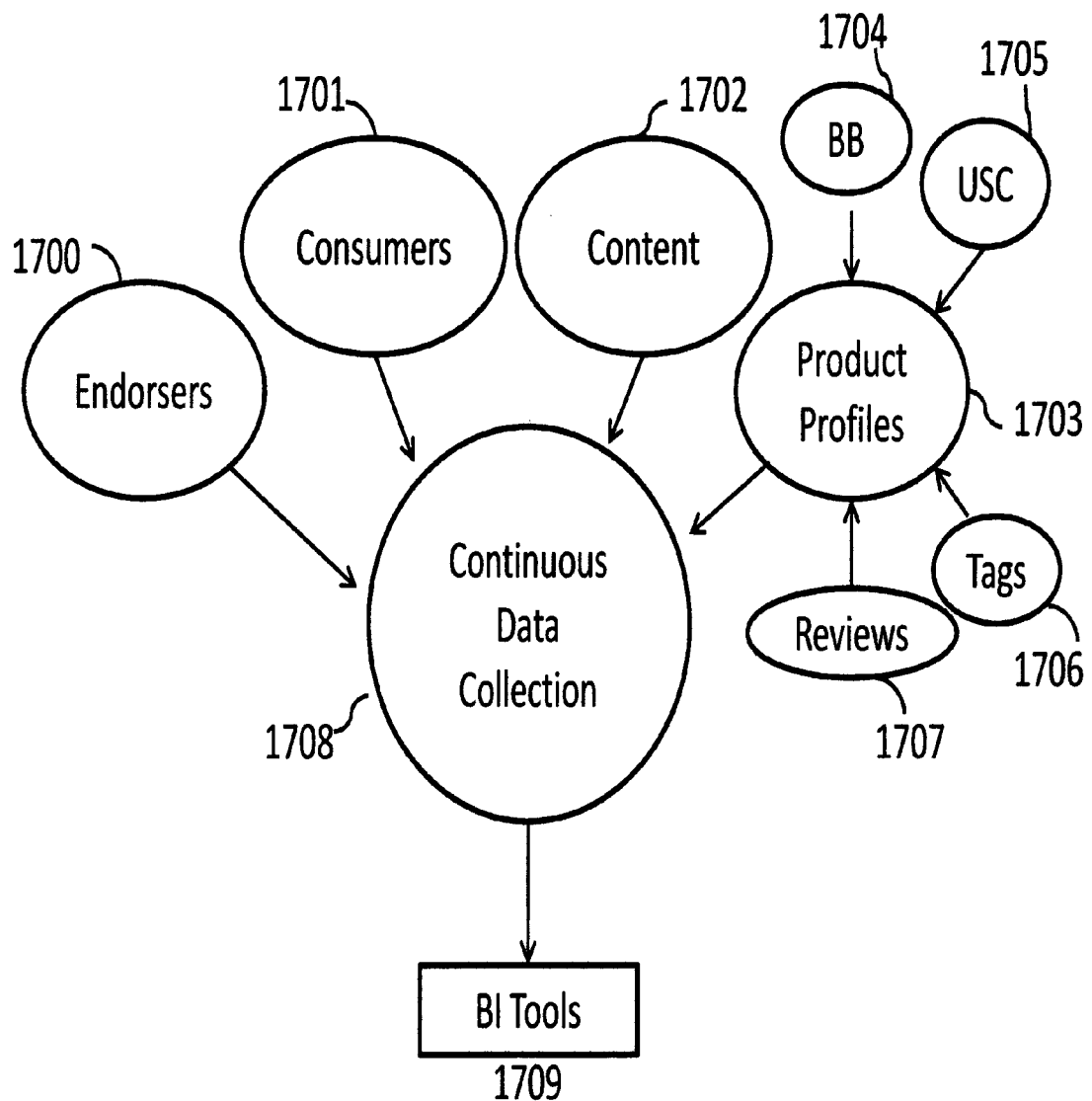
FIG. 17 is a diagram illustrating an embodiment of the invention where by various data is continuously aggregated into one or more related database systems so that this large data set can be accessed by analytics tools

FIG. 17 represents the aggregation of data that is continuously collected 1708 from the various elements of the invention as content is created and viewed and products are endorsed and purchased. A preferred embodiment of the invention includes the continuous collection of profile data from endorsers 1700, consumers 1701, content pages 1702 and the product profiles 1703. Demographic data, user profiles, product categories, click-through rates and product tags are several examples of the type of data that can be collected with this embodiment of the invention. Analysis of this data can provide powerful information to allow merchants to target market to a specific end user profile. Endorser profile data 1700 is available from virtual communities or web portals. Approximately 50% of consumers 1701 viewing content from a virtual community site will also have profile data available as they tend to be "friends" of the endorser. In one embodiment the system keeps counts of views of content 1702 page and of click-through rates. From this data it can be determined, in an embodiment, what kinds of content lead to the highest click-through rates for a given product. In another embodiment, endorsers that have the highest sell through rates can be identified. This information can be valuable both to merchants and to endorsers, for example by suggesting what products are likely to be most effectively endorsed with a given audience 1701 or content 1702. In yet another embodiment, merchants can use collected data to determine which endorsers 1700 they would most desire to participate in a given campaign, or which endorsers will be eligible for preferred discounts or revenue share options. Product profiles 1703 are built with data collected from the universal shopping cart 1705 and from BrandBazaar 1704. In an embodiment, consumers can rate 1707 products they purchase and endorsers and users can tag 1706 products with tags that specify attributes of the products that the endorsers or users find important, thereby creating valuable product profile information. In an embodiment of the invention, data is aggregated into one or more related database systems so that this large data set can be accessed by analytics tools such as a Business Intelligence Portal (BI) 1709 and so that the data collected can benefit merchants, service providers, endorsers and consumers.

All of the embodiments outlined in this disclosure are exemplary in nature and should not be construed as limitations of the invention except as claimed below.

What is claimed is:

1. An e-commerce system, comprising:
   an endorsement engine executing on a network-connected server and adapted to enable subscriptions to content from the endorsement engine from users using a syndication feed protocol; and
   interface software executing on a network-connected server coupled to the endorsement engine and adapted to interact with one or more content sources connected over a network, said content sources located remotely from the endorsement engine and hosting content items, distinct from the content from the endorsement engine and of a plurality of content types, and adapted to enable subscriptions to their content from users using the syndication feed protocol;
   wherein the interface software enables an endorsing user to browse the content sources and to select a content item of a particular type from one of the content sources, and the interface software enables the endorsing user to enter a first code associated with the selected content item, and the interface software enables the endorsing user to view product information concerning products available for endorsement and to select a product for endorsement, and the interface software enables the endorsing user to enter a second code associated with the selected product, the second code compatible with the content type of the selected content item; and
   wherein upon retrieval of content by a viewing user who previously subscribed to the content source using the protocol, at least one of the first code and the second code is also provided to the viewing user via the syndication feed protocol; and
   wherein upon the activation of the first code associated with the selected content item by a viewing user, the viewing user is connected to the selected content still located at its original content source and is able to view the selected content while still connected to the interface software; and
   wherein upon the activation of the product second code by a viewing user, the viewing user is connected to a network-connected shopping cart, and is thereby enabled to buy the product.

* * * * *